US011397875B2

(12) United States Patent
Inakoshi et al.

(10) Patent No.: US 11,397,875 B2
(45) Date of Patent: Jul. 26, 2022

(54) SEQUENTIAL LEARNING MAINTAINING A LEARNED CONCEPT

(71) Applicant: FUJITSU LIMITED, Kawasaki (JP)

(72) Inventors: Hiroya Inakoshi, Tama (JP); Takashi Katoh, Kawasaki (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 16/680,562

(22) Filed: Nov. 12, 2019

(65) Prior Publication Data

US 2020/0160119 A1  May 21, 2020

(30) Foreign Application Priority Data

Nov. 15, 2018  (JP) .............................. JP2018-214993

(51) Int. Cl.
*G06K 9/62* (2022.01)
*G06N 3/04* (2006.01)
*G06N 3/08* (2006.01)
*G06V 20/00* (2022.01)

(52) U.S. Cl.
CPC ......... *G06K 9/6262* (2013.01); *G06N 3/0454* (2013.01); *G06N 3/088* (2013.01)

(58) Field of Classification Search
CPC ............. G06K 9/6262; G06K 9/00624; G06K 9/6271; G06N 3/0454; G06N 3/088; G06N 3/0472
See application file for complete search history.

(56) References Cited

U.S. PATENT DOCUMENTS

| | | | |
|---|---|---|---|
| 2018/0101770 A1* | 4/2018 | Tanaka | G06N 3/0472 |
| 2019/0130278 A1* | 5/2019 | Karras | G06N 3/088 |
| 2019/0286950 A1* | 9/2019 | Kiapour | G06V 10/82 |
| 2020/0065479 A1* | 2/2020 | Xia | G06F 21/53 |

OTHER PUBLICATIONS

Antonia Creswell, et al., "Generative Adversarial Networks: An Overview", IEEE-SPM, pp. 1-14, Apr. 2017.
James Kirkpatrick, et al., "Overcoming catastrophic forgetting in neural networks", arXiv:1612.00796, Dec. 2, 2016.
Hanul Shin, et al.,"Continual Learning with Deep Generative Replay", arXiv:1705.08690, 31st Conference on Neural Information Processing Systems (NIPS 2017), May 24, 2017.

* cited by examiner

*Primary Examiner* — John W Lee
(74) *Attorney, Agent, or Firm* — Fujitsu Patent Center

(57) ABSTRACT

An apparatus receives, at a discriminator within a generative adversarial network, first generation data from a first generator within the generative adversarial network, where the first generator has performed learning using a first data group. The apparatus receives, at the discriminator, a second data group, and performs learning of a second generator based on the first generation data and the second data group where the first generation data is handled as false data by the discriminator.

15 Claims, 14 Drawing Sheets

SEQUENTIAL LEARNING MAINTAINING A LEARNED CONCEPT

CROSS-REFERENCE TO RELATED APPLICATION

This application is based upon and claims the benefit of priority of the prior Japanese Patent Application No. 2018-214993, filed on Nov. 15, 2018, the entire contents of which are incorporated herein by reference.

FIELD

The embodiment discussed herein are related to sequential learning maintaining a learned concept.

BACKGROUND

In the field of artificial intelligence (AI), a large amount of learning data is indispensable in image recognition by means of deep learning. The learning data may also be referred to as teach data or training data. In processing of the sequential learning in which learning is carried out utilizing previously learned results, learning is to be redone every time a discrimination model is generated, which is computationally expensive. Learning data are intellectual assets of a learning data provider, and thus it is often the case that a vender that undertakes learning based on the deep learning is asked to discard the learning data.

The learning data to be used in learning of the discrimination model is created by labeling of sample data such as images or the like, which generally takes time and costs money, however. On the other hand, there is known a generative adversarial network (GAN) as a system that learns, with precision, probability distribution followed by a detailed target such as image data. The GAN includes a generation model and a discrimination model. The generation model generates new data (generation data) similar to the learning data, based on a random number. The discrimination model discriminates the generation data generated by the generation model from the learning data. The generation model performs learning that seeks a parameter to generate data similar to the learning data to stop the discrimination model from making a discrimination. The discrimination model performs learning that seeks a parameter to make it possible to discriminate the learning data from the generation data generated by the generation model. For example, the generation model learns to generate the generation data that cheats the discrimination model, while the discrimination model learns to be able to make a distinction between the generation data and the learning data without being cheated by the generation model. Such learning being repeated, the generation model is obtained that may generate data with high similarity to the learning data, and the discrimination model is obtained that has improved precision of discrimination that makes a distinction between authentic data (learning data) and fake data (generation data).

There is proposed a system that uses such GAN and learns a model utilizing the generation data of the generation model generated by the GAN, without retaining previously used learning data. The system first creates a generation model with the GAN based on the learning data, and creates a solution model, referred to as a "solver" from learning, independently of the generation model. The "solver" predicts a label of the learning data and outputs the label. The system creates a new solution model, using newly labelled learning data (sample data and label), output (generation data) of a pre-created generation model, and output (predicted label) of the solution model to this generation data.

Related techniques are disclosed in, for example, James Kirkpatrick, et al., "Overcoming catastrophic forgetting in neural networks", arXiv:1612.00796, 2 Dec. 2016 and S. Hanul, et al., "Continual Learning with Deep Generative Replay", arXiv:1705.08690, 24 May 2017.

SUMMARY

According to an aspect of the embodiments, an apparatus receives, at a discriminator within a generative adversarial network, first generation data from a first generator within the generative adversarial network, where the first generator has performed learning using a first data group. The apparatus receives, at the discriminator, a second data group, and performs learning of a second generator based on the first generation data and the second data group where the first generation data is handled as false data by the discriminator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The aforementioned system aims to generate a model that may discriminate a new concept using learning data that includes the concept. However, if a previously learned concept does not overlap the concept included in the new learning data (the concepts are not similar), it is possible that previously learned results may not be reflected in a model and the concepts learned from the model may be abandoned.

It is desirable to keep a learned concept from being damaged when a new concept is learned.

With reference to the attached drawings, a sequential learning program, a sequential learning device, and a sequential learning method according to embodiments will be described below. The following respective embodiments which will be described below are not limited to the technology in the disclosure. The following respective embodiments may be appropriately combined without contradiction of details of processes.

Embodiment 1

[Example of Functional Configuration of Sequential Learning Device]

Figure 1:
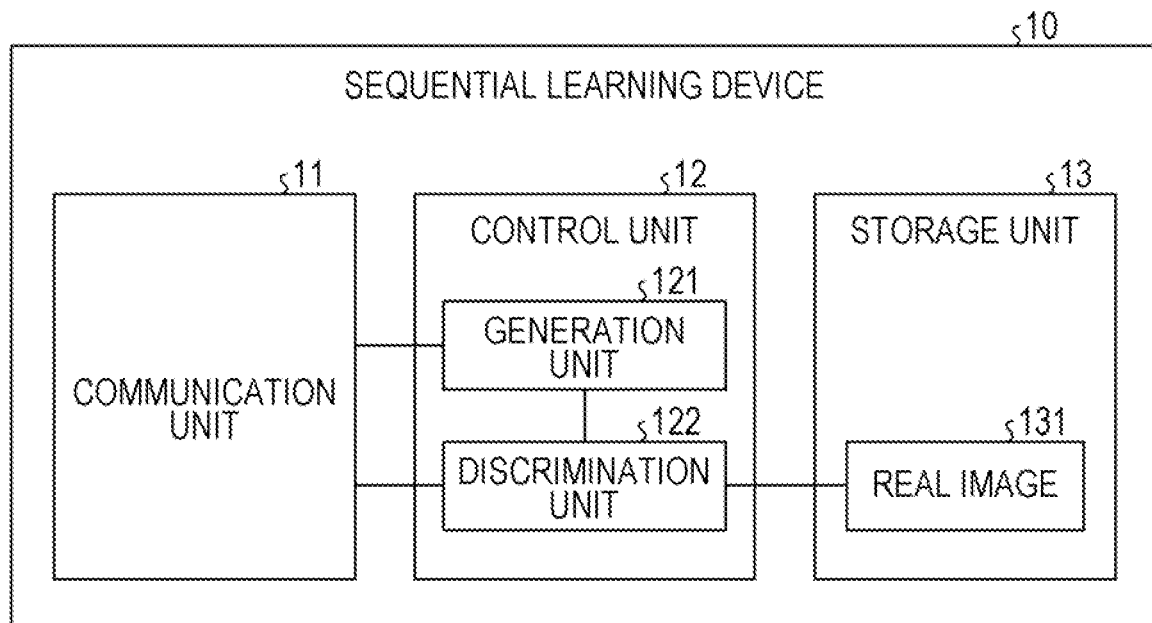
FIG. 1 is a block diagram illustrating an example of a functional configuration of a sequential learning device according to Embodiment 1.

FIG. 1 is a block diagram illustrating an example of a functional configuration of a sequential learning device according to Embodiment 1, With reference to FIG. 1, description is given of an example of the functional configuration of a sequential learning device 10 according to Embodiment 1.

The sequential learning device 10 illustrated in FIG. 1 is a device that learns (sequential learning) new learning data, utilizing GAN and a model, using output (generation data) of a generation model that is already created. As illustrated in FIG. 1, the sequential learning device 10 includes a communication unit 11, a control unit 12, and a storage unit 13. In the following, description is given assuming that learning data as well as data or the like outputted by a generation model are "images".

The communication unit 11 is a processing unit that is in data communication with another sequential learning device 10 and an external device. Specifically, the communication unit 11 receives output (generation data) from a generation model in the other sequential learning device 10 or transmits to outside the generation data outputted by the generation model included in the control unit 12.

The control unit 12 is a processing unit that performs processing of the sequential learning. As illustrated in FIG. 1, the control unit 12 includes a generation unit 121 and a discrimination unit 122. The generation unit 121 corresponds to an example of each of a first generator, a second generator, a third generator, and a fourth generator. The discrimination unit 122 corresponds to an example of each of a first discriminator, a second discriminator, a third discriminator, and a fourth discriminator.

The generation unit 121 is the processing unit (generation model) that inputs data such as a random number and generates an image, which is discriminated as a true image by the discrimination unit 122, as a generated image that is an example of generation data. The generation unit 121 performs learning by outputting to the discrimination unit 122 the generated image that is generated, receiving a discrimination result by the discrimination unit 122, and making an update seeking a parameter to generate an image that makes it difficult for the discrimination unit 122 to discriminate the image from the true image.

The discrimination unit 122 is the processing unit (discrimination model) that inputs an image and discriminates whether or not the image is the true image. If the inputted true image is determined as "true" by the discrimination unit 122 and a false image is determined as "false", a discrimination result is a correct answer. On the other hand, if the inputted true image is determined as "false" by the discrimination unit 122, and if the false image is determined as "true", the discrimination result is an incorrect answer.

The discrimination unit 122 inputs, as the true image, a real image 131 that is new learning data with a predetermined object stored in the storage unit 13, to be described below, inputs the generated image generated by the generation unit 121 as the false image, and determines authenticity of the respective images. The real image 131 corresponds to an example of each of a first data group, a second data group, and a third data group. The discrimination unit 122 outputs to the generation unit 121 the discrimination result relating to the generated image generated by the generation unit 121. Based on respective discrimination results, the discrimination unit 122 performs learning by making the update seeking a parameter that makes it possible to determine with precision whether or not the inputted image is the true image or the false image. For example, if the discrimination unit 122 determines that the generated image inputted as the false image is "true", the discrimination result is the incorrect answer. As described below, the discrimination unit 122 inputs a generated image generated by a generation unit (generation model), which is different from the generation unit 121 that is already created, determines authenticity of the generated image, and performs the learning based on the discrimination result in a similar manner to what is described above.

The storage unit 13 is a storage device that stores an operating system (OS) executed by the control unit 12, a sequential learning program that implements leaning processing of the aforementioned generation unit 121 and discrimination unit 122, and data used in various types of programs such as an application program and middleware. The storage unit 13 stores the real image 131 as the new learning data with the predetermined object, as described above.

The new learning data stored in the storage unit 13 is, for example, data related to an intellectual asset provided by a vendor that commissions creation of a learned model (discrimination model). In this case, a vendor that is provided with the learning data utilizes the learning data, and delivers to the vendor that provides the learning data a discrimination model created through learning processing of the sequential learning device 10 according to Embodiment 1. For example, a vendor that commissions creation of a discrimination model that discriminates an image of wild birds of America, provides, as the learning data, data of a real image of the wild birds of America for a vendor that undertakes the creation of the discrimination model. As a form for the commissioned vendor to deliver, the vendor may deliver, for example, a storage medium that stores data (parameters, or the like) related to an entity of the created discrimination model. Alternatively, the vendor may deliver an information processor or an information processing system that includes the created discrimination model and that enables discrimination processing on inputted evaluation data. Then, as described above, after the learning work is carried out, it is often the case that the commissioned vendor is asked to discard the learning data that the vendor utilizes. In the sequential learning device 10 according to Embodiment 1, although details are described below, it is possible to retain a generation model created from learning that utilizes previously utilized learning data even though that learning data is discarded. Utilization of generation data generated by the generation model in place of the past discarded learning data, and furthermore the learning processing utilizing newly provided learning data make it possible to obtain a new generation model and a discrimination model. In this case, since the already created generation model includes learning result (probability distribution of past learning data) based on the past learning data, there is no chance of abandoning the probability distribution. It is possible to obtain models (generation model and discrimination model) that conform to the probability distribution of learning data to be newly utilized, that is, models that learn a new concept included in the new learning data.

[Overview of Learning Processing of Sequential Learning Device]

Figure 2:
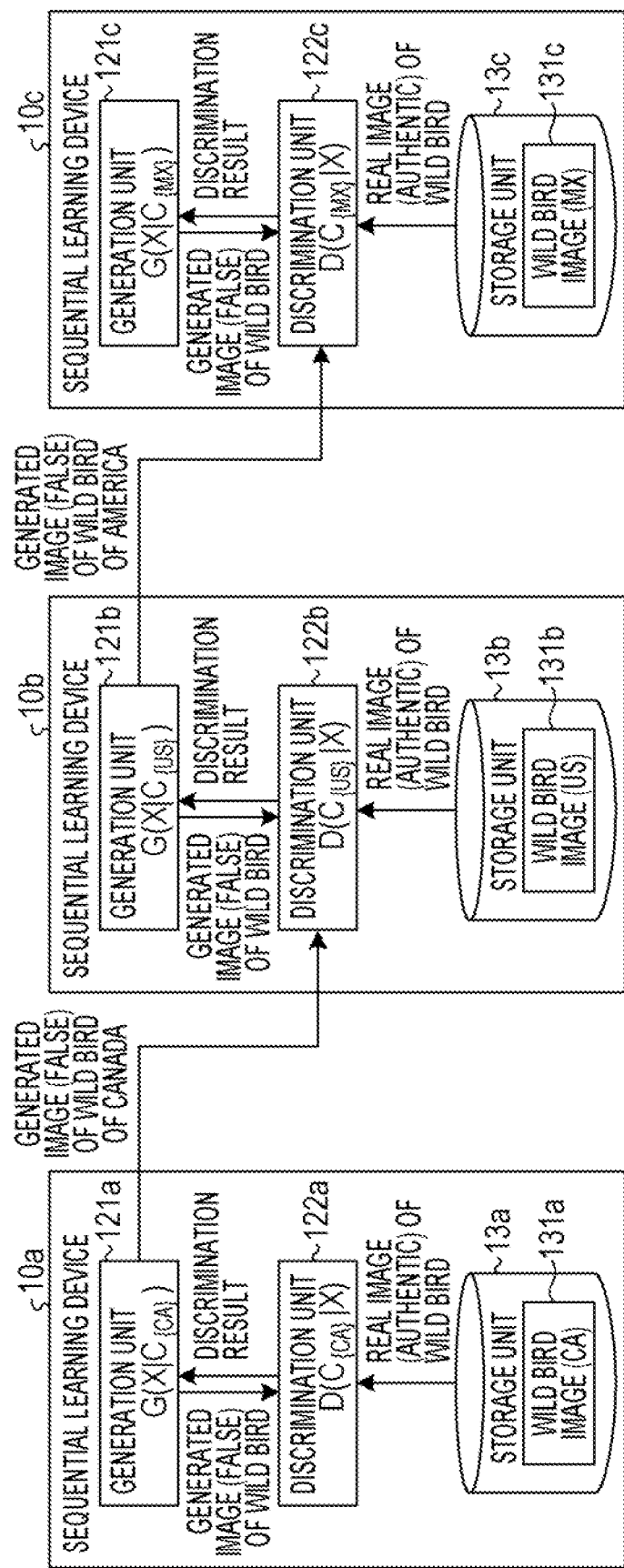
FIG. 2 is a diagram illustrating an action to learn using a generated image of an existing generation unit.

FIG. 2 is a diagram illustrating an action to learn using a generated image of an existing generation unit. With reference to FIG. 2, description is given of an example of an overview of the learning processing of the sequential learning device 10 according to Embodiment 1. Images mentioned in the description based on FIG. 2 are images related to wild birds.

Sequential learning devices 10a to 10c illustrated in FIG. 2 are each a device similar to the sequential learning device 10 according to Embodiment 1. The sequential learning device 10a includes a generation unit 121a, a discrimination unit 122a, and a storage unit 13a that have similar functions to the aforementioned generation unit 121, discrimination unit 122, and storage unit 13. Similarly, the sequential learning device 10b includes a generation unit 121b, a discrimination unit 122b, and a storage unit 13b, and the sequential learning device 10c includes the generation unit 121c, the discrimination unit 122c, and the storage unit 13c. The generation unit 121a corresponds to an example of the first generator. The discrimination unit 122a corresponds to an example of the first discriminator. The generation unit 121b corresponds to an example of the second generator. The discrimination unit 122b corresponds to an example of the second discriminator. The generation unit 121c corresponds to an example of the third generator. The discrimination unit 122c corresponds to an example of the third discriminator.

Here, symbols denoted in FIG. 2 are defined as follows. "G" in the following corresponds to an initial character of a "generator" and that "D" in the following corresponds to an initial character of a "discriminator".

X: Random variable of a wild bird image $C_S$: Random variable representing a country belonging to a set S and not being any of them $G(X|C_S)$: Probability distribution of the random variable X of the wild bird images conditioned by the country set S, and a generation model of the probability distribution $D(C_S|X)$: Probability distribution of determining that the wild bird is of the country set S when an image of the wild bird corresponding to the random variable X is seen, and the discrimination model of the probability distribution As illustrated in FIG. 2, in the sequential learning device 10a the generation unit 121a ($G(X|C_{\{CA\}})$) inputs the data such as the random number, generates the generated image that causes the discrimination unit 122a to discriminate the generated image of the wild birds of Canada (CA) as a true image, and outputs the generated image to the discrimination unit 122a. The generated image generated by the generation unit 121a corresponds to an example of first generation data.

The discrimination unit 122a ($D(C_{\{CA\}}|X)$) inputs, as the true image, the real image 131a of the wild birds of Canada (CA), which is the learning data stored in the storage unit 13a, and inputs, as a false image, the generated image of the wild bird generated by the generation unit 121a. The real image 131a corresponds to an example of the first data group. The discrimination unit 122a determines authenticity of the respective inputted Images. The discrimination unit 122a outputs to the generation unit 121a the discrimination result to the generated image generated by the generation unit 121a. Based on the respective discrimination results, the discrimination unit 122a performs the learning by making the update seeking the parameter that makes it possible to determine with precision whether the inputted image is the true image or the false image. For example, the discrimination unit 122a learns to only the image of the wild birds of Canada (CA).

The generation unit 121a receives the discrimination result by the discrimination unit 122a and performs the learning by making the update seeking a parameter to generate an image that makes it difficult for the discrimination unit 122a to discriminate the image from the true image. For example, the generation unit 121a learns to generate the image that is identified as the image of the wild birds of Canada (CA).

Repeated learning processing of the generation unit 121a and the discrimination unit 122a according to such normal operations of GAN as described above creates each of a generation model and a discrimination model. After the learning processing, the learning data (real image 131a of the wild birds of Canada (CA)) used in the learning is discarded. For example, to the vendor that provides the aforementioned learning data and commissions the creation of the discrimination model that discriminates the image of the wild birds of Canada (CA), it is possible to deliver the discrimination model according to the aforementioned delivery aspect. Although the learning data used in the learning (real image 131a of the wild birds of Canada (CA)) is discarded and does not remain in the vendor that delivers the discrimination model, the generation model (generation unit 121a) that may generate an image identical or similar to the real image of the wild birds of Canada (CA) remains in the vendor's hand.

As illustrated in FIG. 2, in the sequential learning device 10b, the generation unit 121b ($G(X|C_{\{US\}})$) inputs data such as a random number, generates a generated image that causes the discrimination unit 122b to discriminate the image as the true image (here, a generated image of the wild bird of America (US)), and outputs the generated image to the discrimination unit 122b. The generated image generated by the generation unit 121b corresponds to an example of second generation data.

The discrimination unit 122b ($D(C_{\{US\}}|X)$) inputs, as the true image, a real image 131b of the wild birds of America (US), which is new learning data stored in the storage unit 13b and inputs, as the false image, the generated image of the wild bird generated by the generation unit 121b. The real image 131b corresponds to an example of the second data group. The discrimination unit 122b inputs, as the false image, the generated image of the wild birds of Canada (CA) generated by the generation unit 121a, which is the already created generation model. The discrimination unit 122b determines authenticity of the respective inputted images. The discrimination unit 122b outputs to the generation unit 121b the discrimination result to the generated image generated by the generation unit 121b. Based on the respective discrimination results, the discrimination unit 122b performs the learning by making the update seeking the parameter that makes it possible to determine with precision whether the inputted image is the true image or the false image. For example, the discrimination unit 122b learns to identify only the image of the wild bird of America (US).

The generation unit 121b receives the discrimination result by the discrimination unit 122b and performs the learning by making the update seeking the parameter to generate an image that makes it difficult for the discrimination unit 122b to discriminate the image from a true image. For example, the generation unit 121b learns to generate the image that is identified as the image of the wild bird of America (US).

Repeated learning processing of the generation unit 121b and the discrimination unit 122b as described above creates each of a generation model and a discrimination model. In the sequential learning device 10b, the real image 131a of the wild birds of Canada (CA) used in the learning in the sequential learning device 10a is discarded. In place of that real image 131a, a generated image of wild birds of Canada (CA) generated by the generation unit 121a which is already created as the generation model is inputted to the discrimination unit 122b as the false image. For example, to the discrimination unit 122b, the real image of the wild birds of America (US), which is the new learning data, is inputted as the true image and the generated image of the wild birds of Canada (CA) generated by the generation model (generation unit 121a) that is already created is inputted as the false image. The discrimination unit 122b inputs, as the false image, the generated image of the generation model (generation unit 121a) including learning results based on the past learning data (real image of the wild birds of Canada (CA)). It becomes possible to identify emphasizing only a concept of the new learning data (real image of the wild birds of America (US)) with no learning results. Since the generation unit 121b may generate the image as described above that causes the discrimination unit 122b to discriminate the true image (real image of the wild birds of America (US)), as for image generation processing by the generation unit 121b, it becomes possible to generate emphasizing only a concept of the new learning data (real image of the wild birds of America (US)) with no learning results.

After the learning processing, the learning data (real image 131b of the wild birds of America (US)) used in the learning is discarded. For example, to the vendor that provides the aforementioned learning data and commissions the creation of the discrimination model that discriminates the image of the wild birds of America (US), it is possible to deliver the discrimination model according to the aforementioned delivery aspect. Although the learning data (real image 131b of the wild birds of America (US)) used in the learning is discarded and does not remain in the vendor that delivers the discrimination model, the generation model (generation unit 121b) that may generate an image identical or similar to the real image of the wild bird of America (US) remains in the vendor's hand.

As illustrated in FIG. 2, in the sequential learning device 10c, the generation unit 121c ($G(X|C_{\{MX\}})$) inputs the data such as the random number, generates the generated image that causes the discrimination unit 122c to discriminate the image as the true image (here, the generated image of the wild birds of Mexico (MX)), and outputs the generated image to the discrimination unit 122c. The generated image generated by the generation unit 121c corresponds to an example of third generation data.

The discrimination unit 122c ($D(C_{\{MX\}}|X)$) inputs, as the true mage, a real image 131c (example of the third data group) of the wild birds of Mexico (MX), which is the new learning data stored in the storage unit 13c and inputs, as the false image, the generated image of the wild birds generated by the generation unit 121c. The discrimination unit 122c inputs, as the false image, the generated image of the wild birds of America (US) generated by the generation unit 121b, which is the already created generation model. The discrimination unit 122c determines authenticity of the respective inputted images. The discrimination unit 122c outputs to the generation unit 12k the discrimination result to the generated image generated by the generation unit 121c. Based on the respective discrimination results, the discrimination unit 122c performs the learning by making the update seeking the parameter that makes it possible to determine with precision whether the inputted image is the true image or the false image. For example, the discrimination unit 122c learns to identify only the image of the wild birds of Mexico (MX).

The generation unit 121c receives the discrimination result by the discrimination unit 122c and performs the learning by making the update seeking the parameter to generate the image that makes it difficult for the discrimination unit 122c to discriminate the image from a true image. For example, the generation unit 121c learns to generate the image that is identified as the image of the wild birds of Mexico (MX).

Repeated learning processing of the generation unit 12k and the discrimination unit 122c as described above creates each of a generation model and a discrimination model. In the sequential learning device 10c, the real image 131b of the wild birds of America (US) used in the learning in the sequential learning device 10b is discarded. In place of that real image 131b, the generated image of wild birds of America (US) generated by the generation unit 121b which is already created as the generation model is inputted to the discrimination unit 122c as the false image. For example, to the discrimination unit 122c, the real image of the wild birds of Mexico (MX), which is the new learning data, is inputted as the true image and the generated image of the wild birds of America (US) generated by the generation model (generation unit 121b) that is already created is inputted as the false image. The discrimination unit 122c inputs, as the false image, the generated image of the generation model (generation unit 121b) including the learning results based on the past learning data (real images of the wild birds of America (US) and Canada (CA)). It becomes possible to identify emphasizing only a concept of the new learning data (real image of the wild birds of Mexico (MX)) with no learning results. Since the generation unit 121c may generate the image as described above that causes the discrimination unit 122c to discriminate the true image (real image of the wild birds of Mexico (MX)), as for image generation processing by the generation unit 121c, it becomes possible to generate emphasizing only a concept of the new learning data (real image of the wild birds of Mexico (MX)) with no learning results.

After the learning processing, the learning data (real image 131c of the wild birds of Mexico (MX)) used in the learning is discarded. For example, to the vendor that provides the aforementioned learning data and commissions the creation of the discrimination model that discriminates the image of the wild birds of Mexico (MX), it is possible to deliver the discrimination model according to the aforementioned delivery aspect. Although the learning data (real image 131c of the wild birds of Mexico (MX)) used in the learning is discarded and does not remain in the vendor that delivers the discrimination model, the generation model (generation unit 121c) that may generate an image identical or similar to the real image of the wild birds of Mexico (MX) remains in the vendor's hand.

For the sake of convenience, although description is given with the sequential learning devices divided to the sequential learning devices 10a to 10c in FIG. 2, a configuration is not limited to this, and each learning processing may be performed by the identical device (sequential learning device 10). For example, although the discrimination unit 122b of the sequential learning device 10b inputs generated image from the generation unit 121a of the sequential learning device 10a, a function as a generation model of the generation unit 121a in the sequential learning device 10a may remain. The real image 131b may be stored in the storage unit 13a and the learning processing of the generation unit 121b and the discrimination unit 122b may be carried out in the same sequential learning device 10a.

[Details of Learning Processing of Sequential Learning Device]

Figure 3:
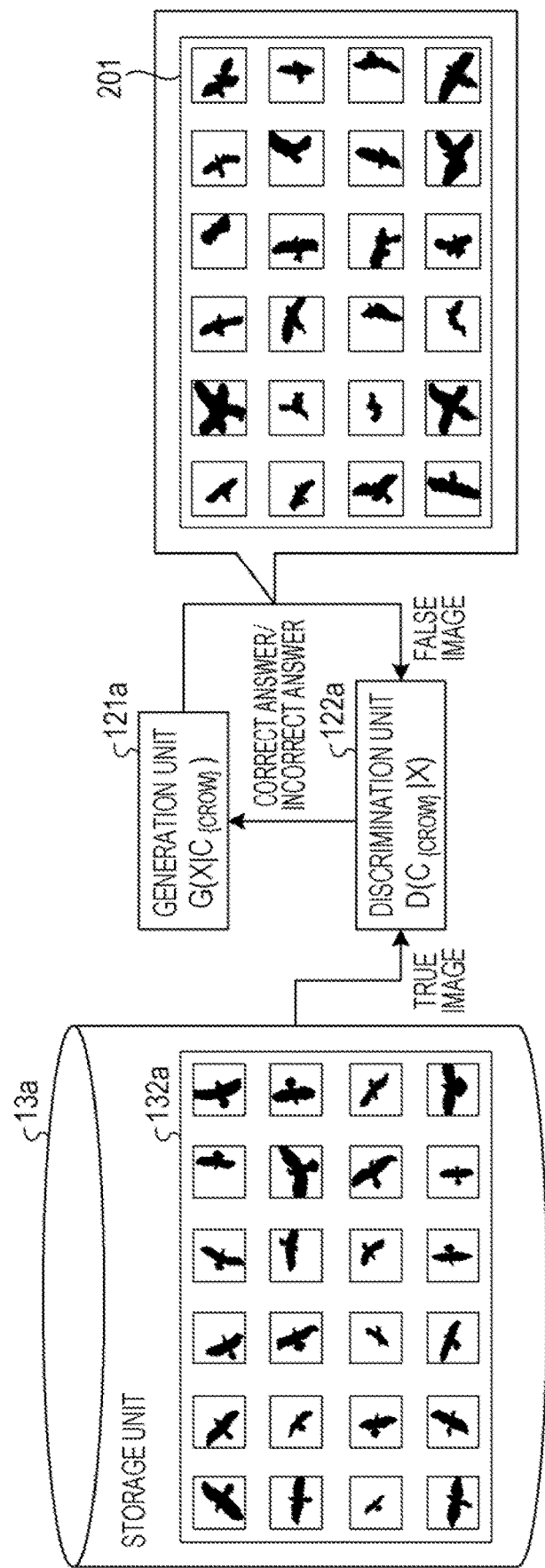
FIG. 3 is a diagram illustrating an action to discriminate an only specific image as a first task.
Figure 4:
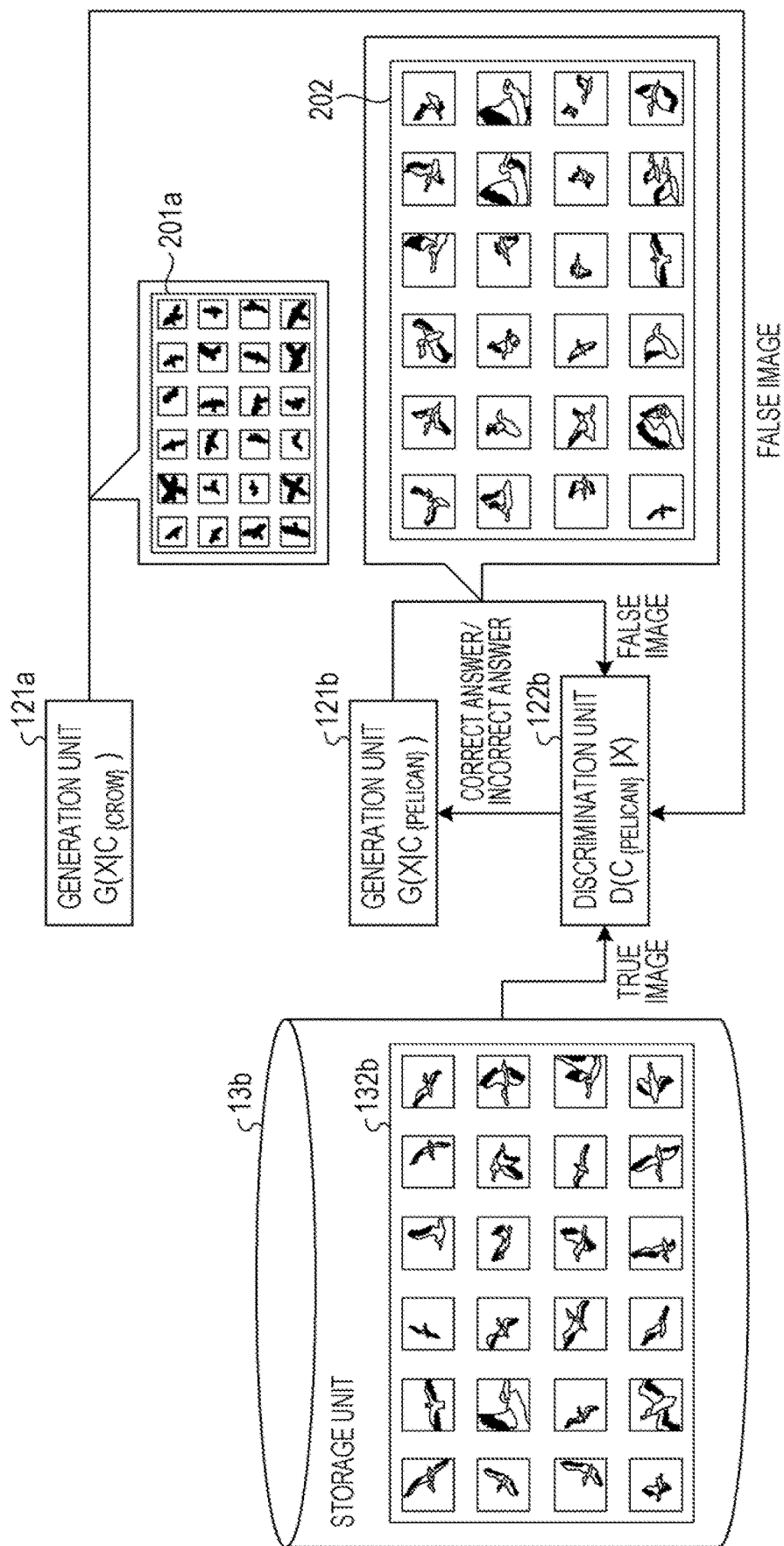
FIG. 4 is a diagram illustrating an action to discriminate an image related to a difference set using the generated image of the existing generation unit as a second task.

FIG. 3 is a diagram illustrating an action to discriminate an only specific image as a first task. FIG. 4 is a diagram illustrating an action to discriminate an image related to a difference set using the generated image of the existing generation unit as a second task. With reference to FIGS. 3 and 4, description is given of an example of details of the learning processing of the sequential learning device 10 according to Embodiment 1.

First, as illustrated in FIG. 3, the storage unit 13a of the sequential learning device 10a (see FIG. 2) stores a real image 132a of crows as the learning data. The real image 132a corresponds to an example of the first data group. In the following, description is given of processing to create a model that discriminates only an image of crows as a first task. In the sequential learning device 10a, the generation unit 121a ($G(X|C_{\{crow\}})$) inputs the dab such as the random number, generates a generated image 201 that causes the discrimination unit 122a to discriminate the image of the crows as the true image, and outputs the generated image to the discrimination unit 122a. The generated image 201 corresponds to an example of the first generation data. However, similarly to the generated image 201 illustrated in FIG. 3, the image generated by the generation unit 121a at an early stage of the learning is an image that is strange as a shape of a crow and includes noise.

The discrimination unit 122a ($D(C_{\{crow\}}|X)$) inputs, as the true image, the real image 132a of the crows, which is the learning data stored in the storage unit 13a and inputs, as the false image, the generated image of the crows generated by the generation unit 121a. The discrimination unit 122a determines authenticity of the respective inputted images. The discrimination unit 122a outputs to the generation unit 121a the discrimination result of whether the discrimination is the correct answer or the incorrect answer, based on the discrimination on the generated image generated by the generation unit 121a. Based on the respective discrimination results, the discrimination unit 122a performs the learning by making the update seeking the parameter that makes it possible to determine with precision whether the inputted image is the true image or the false image. For example, the discrimination unit 122a learns to identify the image of the crows with precision.

The generation unit 121a receives the discrimination result by the discrimination unit 122a and performs the learning by making the update seeking a parameter to generate an image that makes it difficult for the discrimination unit 122a to discriminate the image from the true image. For example, the generation unit 121a learns to generate an image identified as the image of the crows. As described above, although the generated image 201 illustrated in FIG. 3 is the image that is strange and includes noise at the early stage of the learning, the generation unit 121a may generate an image approximate to the real image of the crows as the learning progresses.

Repeated learning processing of the generation unit 121a and the discrimination unit 122a according to such normal operations of GAN as described above creates each of a generation model and a discrimination model. After the learning processing, the learning data (real image 132a of the crows) used in the learning is discarded. For example, to the vendor that provides the aforementioned learning data and commissions the creation of the discrimination model that discriminates the image of the crows, it is possible to deliver the discrimination model according to the aforementioned delivery aspect.

Next, as illustrated in FIG. 4, the storage unit 13b of the sequential learning device 10b (see FIG. 2) stores a real image 132b of pelicans as the learning data. The real image 132b corresponds to an example of the second data group. In the following, description is given of processing to create a model that discriminates only an image of pelicans as a second task. In the sequential learning device 10b, the generation unit 121b ($G(X|C_{\{pelican\}})$) inputs the data such as the random number, generates a generated image 202 that causes the discrimination unit 122b to discriminate the image of the pelicans as a true image, and outputs the generated image to the discrimination unit 122b. The generated image 202 corresponds to an example of the second generation data. However, similarly to the generated image 202 illustrated in FIG. 4, the image generated by the generation unit 121b at the early stage of the learning is an image that is strange as a shape of a pelican and includes the noise.

The discrimination unit 122b ($D(C_{\{pelican\}}|X)$) inputs, as the true image, the real image 132b of pelicans, which is the new learning data stored in the storage unit 13b and inputs, as the false image, the generated image of the pelicans generated by the generation unit 121b. The discrimination unit 122b further inputs, as the false image, the generated image 201a of the crows generated by the generation unit 121a ($G(X|C_{\{crow\}})$), which is the already created generation model. The generated image 201a corresponds to an example of the first generation data. The discrimination unit 122b determines authenticity of the respective inputted images. The discrimination unit 122b outputs to the generation unit 121b the discrimination result to the generated image generated by the generation unit 121b. Based on the respective discrimination results, the discrimination unit 122b performs the learning by making the update seeking the parameter that makes it possible to determine with precision whether the inputted image is the true image or the false image. For example, the discrimination unit 122b learns to identify only the image of the pelicans.

The generation unit 121b receives the discrimination result by the discrimination unit 122b and performs the learning by making the update seeking the parameter to generate an image that makes it difficult for the discrimination unit 122b to discriminate the image from a true image.

For example, the generation unit 121b learns to generate an image identified as the image of the pelicans.

Repeated learning processing of the generation unit 121b and the discrimination unit 122b as described above creates each of a generation model and a discrimination model. In the sequential learning device 10b, the real image 132a of the crows used in the learning in the sequential learning device 10a is discarded. In place of that real image 132a, the generated image of crows generated by the generation unit 121a which is already created as the generation model is inputted to the discrimination unit 122b as the false image. For example, to the discrimination unit 122b, the real image of the pelicans, which is the new learning data, is inputted as the true image and the generated image of the crows generated by the generation model (generation unit 121a) that is already created is inputted as the false image. The discrimination unit 122b inputs, as the false image, the generated image of the generation model (generation unit 121a) including learning results based on the past learning data (real images of the crows). It becomes possible to identify emphasizing only a concept of the new learning data (real image of the pelicans) with no learning results. Since the generation unit 121b may generate the image as described above that causes the discrimination unit 122b to discriminate the true image (real image of the pelicans), as for image generation processing by the generation unit 121b, it becomes possible to generate emphasizing only a concept of the new learning data (real image of the pelicans) with no learning results.

After the learning processing, the learning data (real image 132b of the pelicans) used in the learning is discarded. For example, to the vendor that provides the aforementioned learning data and commissions the creation of the discrimination model that discriminates the image of the pelicans, it is possible to deliver the discrimination model according to the aforementioned delivery aspect.

[Process Flows]

Figure 5:
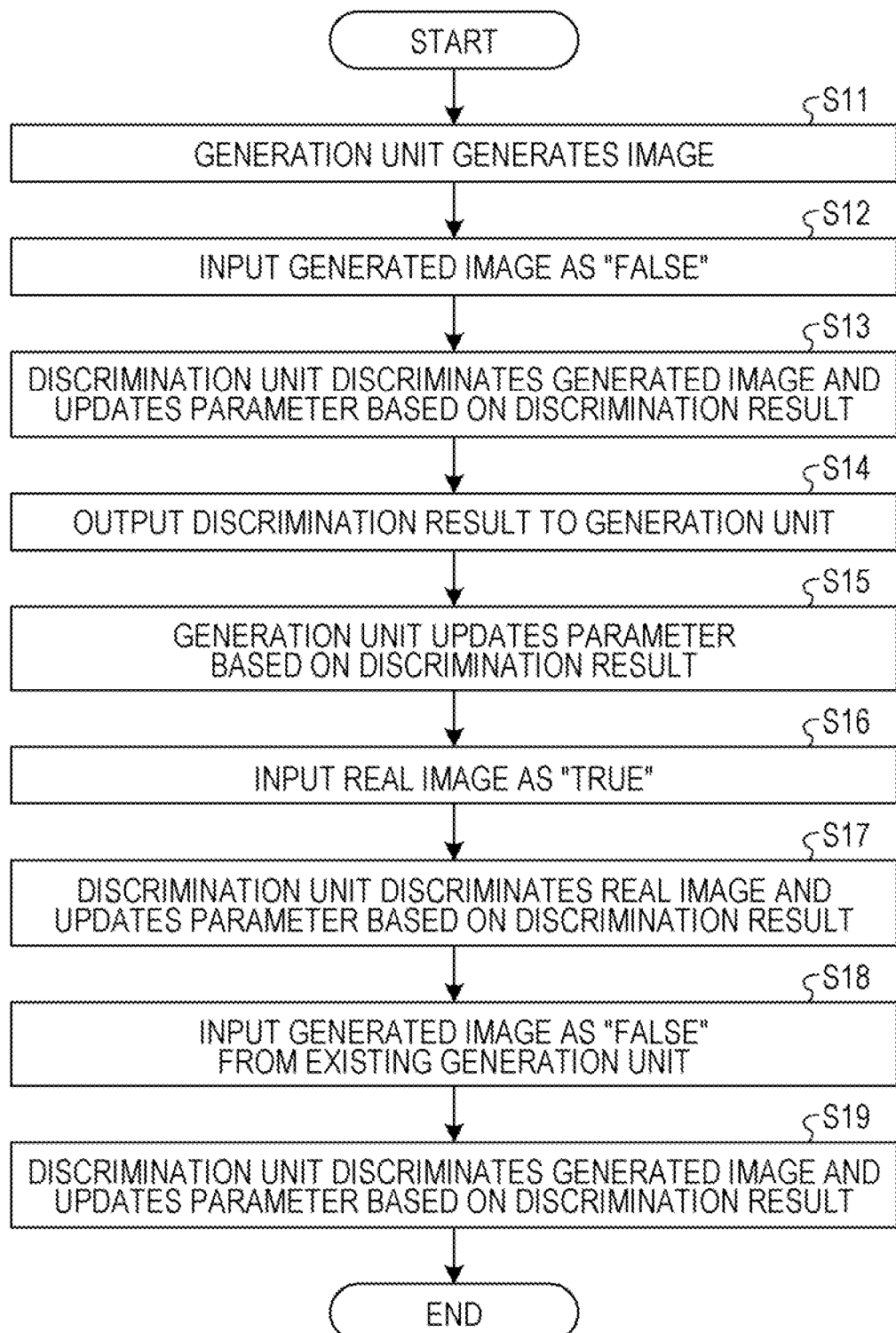
FIG. 5 is a flow chart illustrating an example of flow of a learning action of the sequential learning device according to Embodiment 1.

FIG. 5 is a flow chart illustrating an example of flow of a learning action of the sequential learning device according to Embodiment 1. With reference to FIG. 5, description is given of an example of the flow of the learning action of the sequential learning device 10 according to Embodiment 1. In FIG. 5, description is given, focusing on the learning action in the sequential learning device 10b as the sequential learning device 10.

First, the generation unit 121b inputs the data such as the random number, and generates the generated image that is discriminated as the true image by the discrimination unit 122b (step S11). Next, the discrimination unit 122b inputs the generated image generated by the generation unit 121b as the false image (step S12). The discrimination unit 122b determines authenticity of the inputted generated image, and based on the discrimination result, makes the update seeking the parameter that makes it possible to determine with precision whether the inputted image is the true image or the false image (step S13). With this, the discrimination unit 122b learns to identify the true image with precision.

The discrimination unit 122b outputs to the generation unit 121b the aforementioned discrimination result on the generated image generated by the generation unit 121b (step S14). The generation unit 121b receives the discrimination result by the discrimination unit 122b and makes the update seeking a parameter to generate an image that makes it difficult for the discrimination unit 122b to discriminate the inputted image from the true image (step S15). With this, the generation unit 121b learns to generate an image that the discrimination unit 122b may identify as the true image.

The discrimination unit 122b inputs, as the true image, a real image which is the new learning data stored in the storage unit 13b (step S16). The discrimination unit 122b determines authenticity of the inputted real image, and based on the discrimination result, makes the update seeking the parameter that makes it possible to discriminate with better precision whether the inputted image is the true image or the false image (step S17). With this, the discrimination unit 122b learns to identify the true image with precision.

The discrimination unit 122b inputs, as the false image, the generated image generated by the generation unit 121a which is the already created generation model (step S18). The discrimination unit 122b determines authenticity of the inputted generated image, and based on the discrimination result, makes the update seeking a parameter that makes it possible to discriminate with better precision whether the inputted image is the true image or the false image (step S19). With this, the discrimination unit 122b learns to identify the true image with precision.

By processing of the aforementioned steps S11 to S19 being repeated, the learning action of the sequential learning device 10 is performed. The flow of the learning action of the sequential learning device 10 is not limited to the order of steps S11 to S19 As described above, steps S11 to S15 are processing to handle the generated images generated by the generation unit 121b. Steps S16 and S17 are processing to handle the real images stored in the storage unit 13b. Steps S18 and S19 are processing to handle the generated images generated by the generation unit 121a which is the already created generation model. For example, these steps may be performed in random order. The aforementioned processing is not limited to being performed only once, and for example, processing to handle the real images stored in the storage unit 13b may be performed consecutively.

[One Aspect of Effects]

As described above, in the sequential learning device 10 according to Embodiment 1, the generated image generated by the generation unit, which is already generated as the generation model, is inputted to the discrimination unit as the false image. For example, to the discrimination unit, the real image, which is the new learning data, is inputted as the true image and the generated image generated by the already created generation model (generation unit) is inputted as the false image. Since the discrimination unit inputs, as the false image, the generated image of the generation model (generation unit) including the learning results based on the past learning data, it becomes possible to identify emphasizing only a concept of the new learning data with no learning results. For example, the precision of discrimination on the new concept may be improved by utilizing the past learning results. For already learned generation model to be used in learning about a new discrimination unit and generation unit, it is possible to select and use any model. In this case, all learned generation models may be used. A generation unit to be newly created may generate an image that is discriminated as the true image by the aforementioned discrimination unit, as for image generation processing by the generation unit, it becomes possible to generate emphasizing only a concept of the new learning data with no learning results.

Embodiment 2

For the sequential learning device 10 according to Embodiment 2, description is given, focusing on differences from the sequential learning device 10 according to Embodiment 1. In Embodiment 1, the data generated by the already created generation model is inputted as the false data (image) relative to the newly created discrimination model. In Embodiment 2, in contrast, description is given of an action to input the data generated by the already created generation model as the true data (image). A functional configuration of the sequential learning device 10 according to Embodiment 2 is similar to the configuration of the sequential learning device 10 according to Embodiment 1 illustrated in FIG. 1.

[Overview of Learning Processing of Sequential Learning Device]

Figure 6:
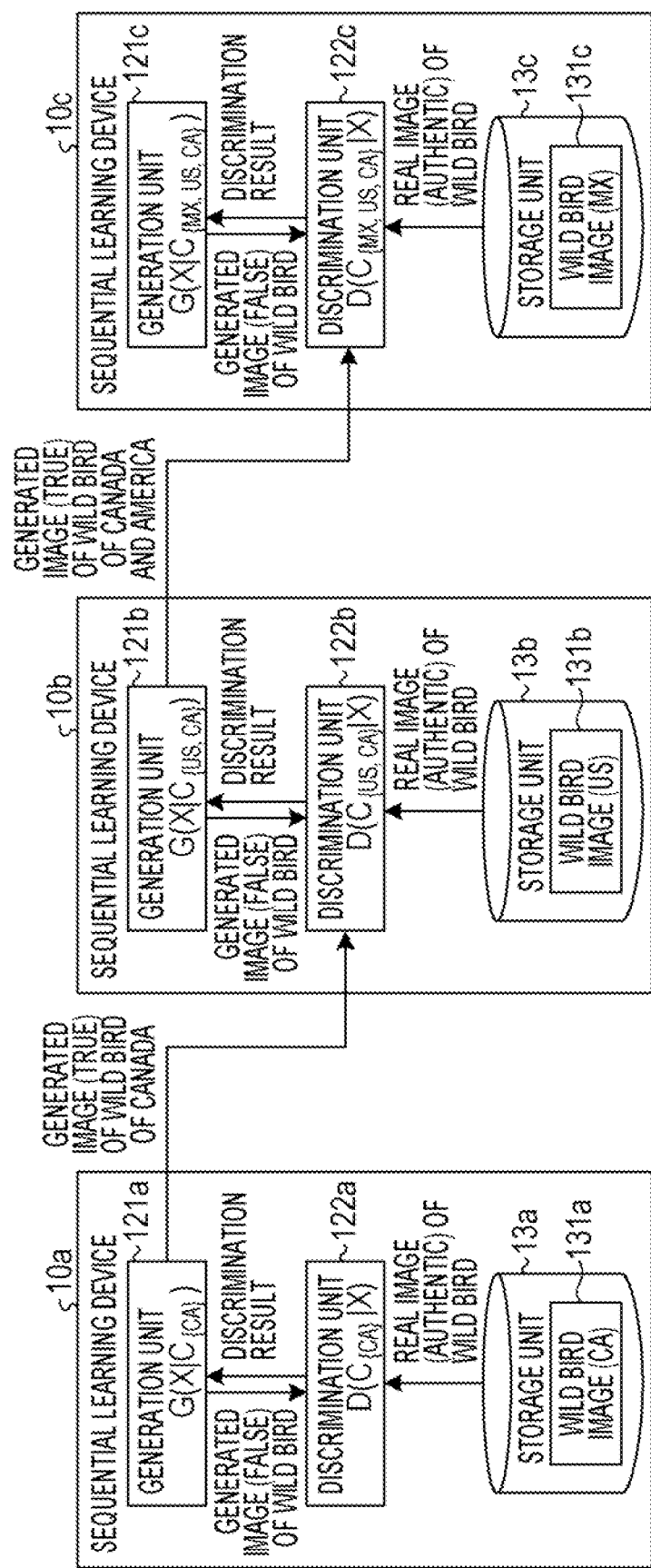
FIG. 6 is a diagram illustrating an action to learn using a generated image of the existing generation unit.

FIG. 6 is a diagram illustrating the action to learn using the generated image of the existing generation unit. With reference to FIG. 6, description is given of an example of an overview of the learning processing of the sequential learning device 10 according to Embodiment 2. The image mentioned in the description based on FIG. 6 is to the image related to the wild birds.

As illustrated in FIG. 6, in the sequential learning device 10a, the generation unit 121a ($G(X|C_{\{CA\}})$) inputs the data such as the random number, generates the generated image that causes the discrimination unit 122a to discriminate the image as a true image (here, the generated image of the wild birds of Canada (CA)), and outputs the generated image to the discrimination unit 122a. The generated image generated by the generation unit 121a corresponds to an example of first generation data.

The discrimination unit 122a ($D(C_{\{CA\}}|X)$) inputs, as the true image, the real image 131a of the wild birds of Canada (CA), which is the learning data stored in the storage unit 13a, and inputs, as a false image, the generated image of the wild bird generated by the generation unit 121a. The discrimination unit 122a determines authenticity of the respective inputted images. The discrimination unit 122a outputs to the generation unit 121a the discrimination result to the generated image generated by the generation unit 121a. Based on the respective discrimination results, the discrimination unit 122a performs the learning by making the update seeking the parameter that makes it possible to determine with precision whether the inputted image is the true image or the false image. For example, the discrimination unit 122a learns to only the image of the wild birds of Canada (CA).

The generation unit 121a receives the discrimination result by the discrimination unit 122a and performs the learning by making the update seeking a parameter to generate an image that makes it difficult for the discrimination unit 122a to discriminate the image from the true image. For example, the generation unit 121a learns to generate the image that is identified as the image of the wild birds of Canada (CA).

Repeated learning processing of the generation unit 121a and the discrimination unit 122a according to such normal operations of GAN as described above creates each of a generation model and a discrimination model. After the learning processing, the learning data (real image 131a of the wild birds of Canada (CA)) used in the learning is discarded. For example, to the vendor that provides the aforementioned learning data and commissions the creation of the discrimination model that discriminates the image of the wild birds of Canada (CA), it is possible to deliver the discrimination model according to the aforementioned delivery aspect. Although the learning data used in the learning (real image 131a of the wild birds of Canada (CA)) is discarded and does not remain in the vendor that delivers the discrimination model, the generation model (generation unit 121a) that may generate an image identical or similar to the real image of the wild birds of Canada (CA) remains in the vendor's hand.

As illustrated in FIG. 6, in the sequential learning device 10b, the generation unit 121b ($G(X|C_{\{US, CA\}})$) inputs the data such as the random number, generates a generated image that causes the discrimination unit 122b to discriminate the image as a true image (here, the generated image of the wild birds of America (US) or Canada (CA)), and outputs the generated image to the discrimination unit 122b. The generated image generated by the generation unit 121b corresponds to an example of second generation data.

The discrimination unit 122b ($D(C_{\{US, CA\}}|X)$) inputs, as the true image, the real image 131b of the wild birds of America (US), which is the new learning data stored in the storage unit 13b and inputs, as the false image, the generated image of the wild birds generated by the generation unit 121b. The discrimination unit 122b further inputs, as the true image, the generated image of the wild birds of Canada (CA) generated by the generation unit 121a, which is the already created generation model. The discrimination unit 122b determines authenticity of the respective inputted images. The discrimination unit 122b outputs to the generation unit 121b the discrimination result to the generated image generated by the generation unit 121b. Based on the respective discrimination results, the discrimination unit 122b performs the learning by making the update seeking the parameter that makes it possible to determine with precision whether the inputted image is the true image or the false image. For example, the discrimination unit 122b learns to identify the image of the wild birds of America (US) or the image of the wild birds of Canada (CA).

The generation unit 121b receives the discrimination result by the discrimination unit 122b and performs the learning by making the update seeking the parameter to generate an image that makes it difficult for the discrimination unit 122b to discriminate the image from a true image. For example, the generation unit 121b learns to generate an image identified as the image of the wild birds of America (US) or the image of the wild birds of Canada (CA).

Repeated learning processing of the generation unit 121b and the discrimination unit 122b as described above creates each of a generation model and a discrimination model. In the sequential learning device 10b, the real image 131a of the wild birds of Canada (CA), which is used in the learning in the sequential learning device 10a, is discarded. In place of that real image 131a, the generated image of the wild birds of Canada (CA), generated by the generation unit 121a which is already created as the generation model, is inputted as the true image in the discrimination unit 122b. For example, in the discrimination unit 122b, the real image of the wild birds of America (US), which is the new learning data, is inputted as the true image, and the generated image of the wild birds of Canada (CA) generated by the already created generation model (generation unit 121a) is inputted as the true image. The discrimination unit 122b inputs, as the true image, the generated image of the generation model (generation unit 121a) including the learning results based on the past learning data (real image of the wild birds of Canada (CA)). It becomes possible to add to the already learned concept (image of the wild birds of Canada (CA)) and identify the concept of the new learning data (real image of the wild birds of America (US)) with no learning results. The generation unit 121b may generate the image that is discriminated as the true image (real image of the wild birds of America (US) or Canada (CA)) by the aforementioned discrimination unit 122b, as for the generation processing of the image by the generation unit 121b, it becomes possible to add a concept of the new learning data (real image of the wild birds of America (US)) and generate the an image with no learning results.

After the learning processing, the learning data (real image 131b of the wild birds of America (US)) used in the learning is discarded. For example, to the vendor that provides the aforementioned learning data and commissions the creation of the discrimination model that discriminates the image of the wild birds of America (US) or Canada (CA), it is possible to deliver the discrimination model according to the aforementioned delivery aspect. Although the learning data (real image 131b of the wild birds of America (US)) used in the learning is discarded and does not remain in the vendor that delivers the discrimination model, the generation model (generation unit 121b) that may generate the image identical or similar to the real image of the wild birds of America (US) or Canada (CA) remains in the vendor's hand.

As illustrated in FIG. 6, in the sequential learning device 10c, the generation unit 121c (G(X|C$_{\{MX, US, CA\}}$)) inputs the data such as the random number, generates a generated image that causes the discrimination unit 122c to discriminate the image as the true image (here, the generated image of the wild birds of Mexico (MX), America (US) or Canada (CA)), and outputs the generated image to the discrimination unit 122c. The generated image generated by the generation unit 121c corresponds to an example of third generation data.

The discrimination unit 122c (D(C$_{\{MX, US, CA\}}$|X)) inputs, as the true image, the real image 131c of the wild birds of Mexico (MX), which is the new learning data stored in the storage unit 13c and inputs, as the false image, the generated image of the wild birds generated by the generation unit 121c. The discrimination unit 122c further inputs, as the false image, the generated image of the wild birds of America (US) or Canada (CA) generated by the generation unit 121b, which is the already created generation model. The discrimination unit 122c determines authenticity of the respective inputted images. The discrimination unit 122c outputs to the generation unit 121c the discrimination result to the generated image generated by the generation unit 121c. Based on the respective discrimination results, the discrimination unit 122c performs the learning by making the update seeking the parameter that makes it possible to determine with precision whether the inputted image is the true image or the false image. For example, the discrimination unit 122c learns to identify the image of the wild birds of Mexico (MX), the image of the wild birds of America (US), or the image of the wild birds of Canada (CA).

The generation unit 121c receives the discrimination result by the discrimination unit 122c and performs the learning by making the update seeking the parameter to generate the image that makes it difficult for the discrimination unit 122c to discriminate the image from a true image. For example, the generation unit 121c learns to generate an image identified as the image of the wild birds of Mexico (MX), the image of the wild birds of America (US), or the image of the wild birds of Canada (CA).

Repeated learning processing of the generation unit 121c and the discrimination unit 122c as described above creates each of a generation model and a discrimination model. In the sequential learning device 10c, the real image 131b of the wild birds of America (US), which is used in the learning in the sequential learning device 10b, is discarded. In place of that real image 131b, the generated image of the wild birds of America (US) or Canada (CA), generated by the generation unit 121b which is already created as the generation model, is inputted as the true image in the discrimination unit 122c. For example, in the discrimination unit 122c, the real image of the wild birds of Mexico (MX), which is the new learning data, is inputted as the true image, and the generated image of the wild birds of America (US) or Canada (CA) generated by the already created generation model (generation unit 121b) is inputted as the true image. The discrimination unit 122c inputs, as the true image, the generated image of the generation model (generation unit 121b) including the learning results based on the past learning data (real image of the wild birds of America (US) or Canada (CA)). It becomes possible to add to the already learned concept (image of the wild birds of America (US) and the image of the wild bird of Canada (CA) and identify the concept of the new learning data (real image of the wild birds of Mexico (MX)) with no learning results. The generation unit 121b may generate the image that is discriminated as the true image (real image of the wild birds of Mexico (MX), America (US), or Canada (CA)) by the aforementioned discrimination unit 122c, as for the generation processing of the image by the generation unit 121c, it becomes possible to add a concept of the new learning data (real image of the wild birds of Mexico (MX)) and generate the image with no learning results.

After the learning processing, the learning data (real image 131c of the wild birds of Mexico (MX)) used in the learning is discarded. For example, to the vendor that provides the aforementioned learning data and commissions the creation of the discrimination model that discriminates the image of the wild birds of Mexico (MX), America (US), or Canada (CA), it is possible to deliver the discrimination model according to the aforementioned delivery aspect. Although the learning data (real image 131c of the wild birds of Mexico (MX)) used in the learning is discarded and does not remain in the vendor that delivers the discrimination model, the generation model (generation unit 121c) that may generate the image identical or similar to the real image of the wild birds of Mexico (MX), America (US), or Canada (CA) remains in the vendor's hand.

[Details of Learning Processing of Sequential Learning Device and Differences from Related-Art Technology]

Figure 7:
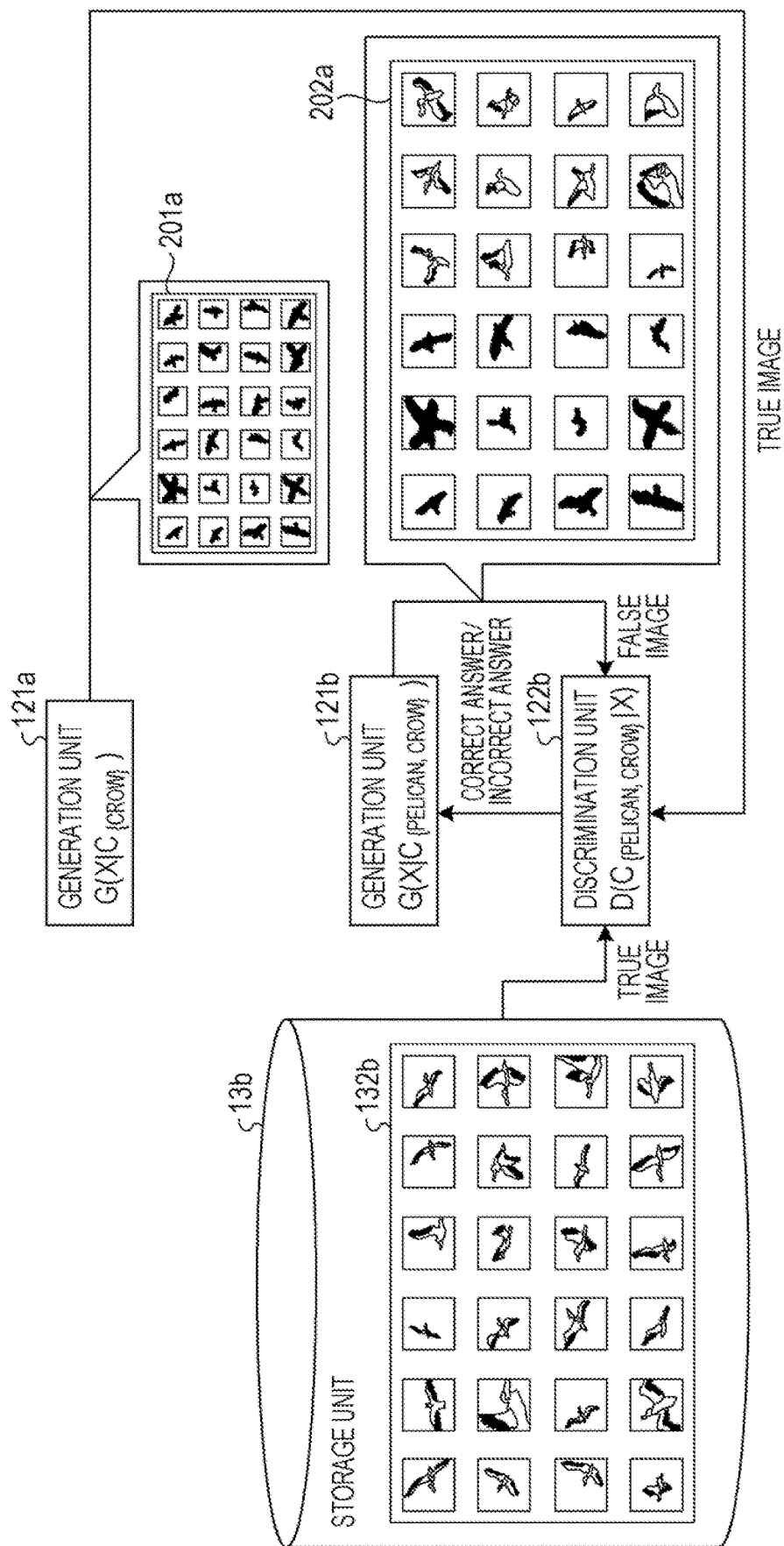
FIG. 7 is a diagram illustrating an action to discriminate an image related to a sum set using the generated image of the existing generation unit as the second task.
Figure 8:
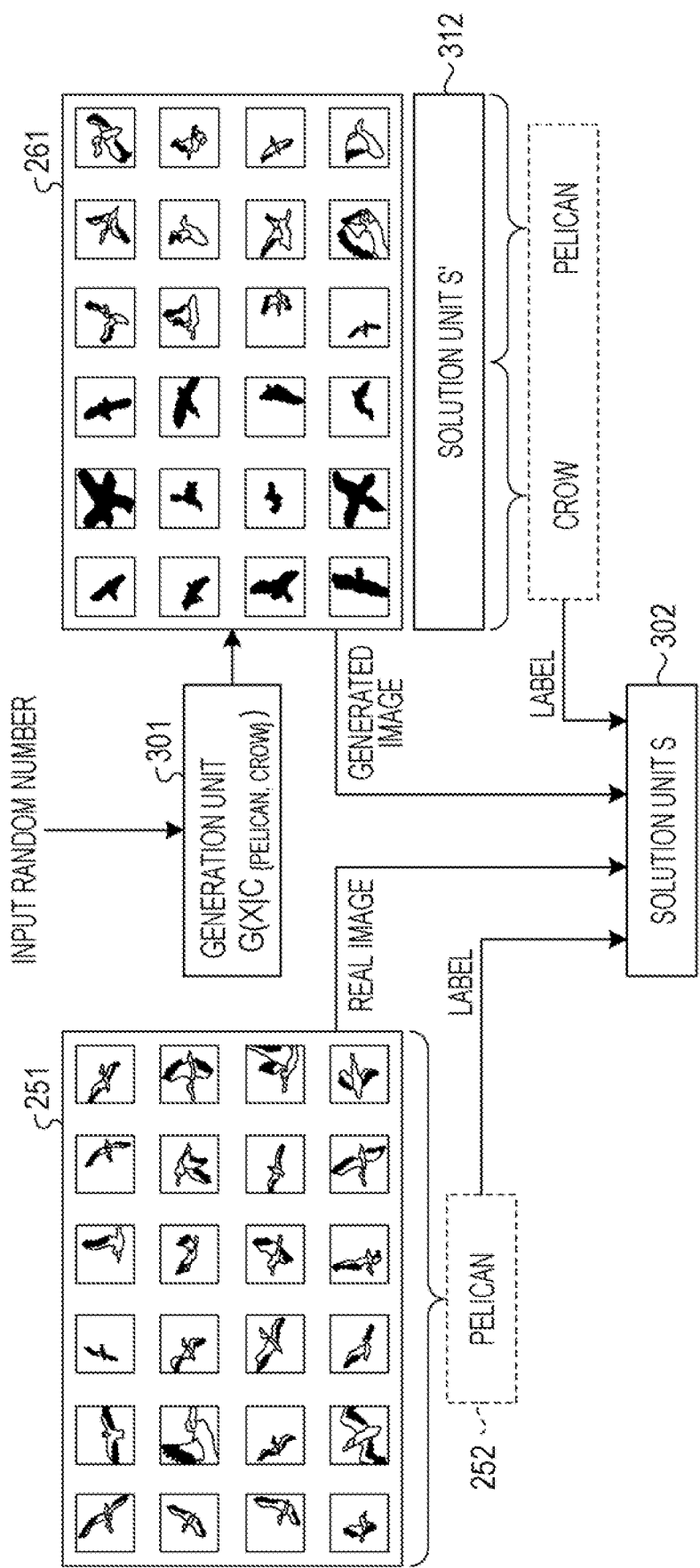
FIG. 8 is a diagram illustrating a learning action of a solution unit of a related-art technology.

FIG. 7 is a diagram illustrating the action to discriminate an image related to a sum set using the generated image of the existing generation unit as the second task. FIG. 8 is a diagram illustrating a learning action of a solution unit of a related-art technology. With reference to FIGS. 7 and 8, description is given of an example of details of the learning processing of the sequential learning device 10 according to Embodiment 2 and differences from the related-art technology. The processing to create the model that discriminates only the image of the crows in the sequential learning device 10a (see FIG. 6) as the first task is similar to the processing described in the aforementioned FIG. 3, and thus it is assumed here that the processing is already complete.

As illustrated in FIG. 7, the storage unit 13b of the sequential learning device 10b (see FIG. 6) stores the real image 132b of the pelicans as the learning data. In the following, description is given of processing to create the model that discriminates the image of the pelicans or the crows, as the second task. In the sequential learning device 10b, the generation unit 121b (G(X|C$_{\{pelican, crow\}}$)) inputs the data such as the random number, generates a generated image 202a that causes the discrimination unit 122b to discriminate the image as a true image (here, the image of the pelicans or the crows), and outputs the generated image to the discrimination unit 122b. The generated image 202a corresponds to an example of the second generation data.

However, like the generated image 202a illustrated in FIG. 7, an image generated by the generation unit 121b at the early stage of the learning is an image that is strange as a shape of a pelican or a crow and includes the noise.

The discrimination unit 122b ($D(C_{\{pelican, crow\}}|X)$) inputs, as the true image, the real image 132b of the pelicans, which is the new learning data stored in the storage unit 13b, and inputs, as the false image, the generated image of the pelicans or the crows generated by the generation unit 121b. The discrimination unit 122b further inputs, as the true image, the generated image 201a of the crows generated by the generation unit 121a ($G(X|C_{\{crow\}})$), which is the already created generation model. The generated image 201a corresponds to an example of the first generation data. The discrimination unit 122b determines authenticity of the respective inputted images. The discrimination unit 122b outputs to the generation unit 121b the discrimination result to the generated image generated by the generation unit 121b. Based on the respective discrimination results, the discrimination unit 122b performs the learning by making the update seeking the parameter that makes it possible to determine with precision whether the inputted image is the true image or the false image. For example, the discrimination unit 122b learns to identify the image of the pelicans or the crows.

The generation unit 121b receives the discrimination result by the discrimination unit 122b and performs the learning by making the update seeking the parameter to generate an image that makes it difficult for the discrimination unit 122b to discriminate the image from a true image. For example, the generation unit 121b learns to generate the image identified as the image of the pelicans or the crows.

Repeated learning processing of the generation unit 121b and the discrimination unit 122b as described above creates each of a generation model and a discrimination model. In the sequential learning device 10b, the real image 132a of the crows, which is used in the learning in the sequential learning device 10a, is discarded. In place of that real image 132a, the generated image of the crows, generated by the generation unit 121a which is already created as the generation model, is inputted as the true image in the discrimination unit 122b. For example, in the discrimination unit 122b, the real image of the pelican, which is the new learning data, is inputted as the true image, and the generated image of the crows generated by the already created generation model (generation unit 121a) is inputted as the true image. The discrimination unit 122b inputs, as the true image, the generated image of the generation model (generation unit 121a) including the learning results based on the past learning data (real image of the crows). It becomes possible to add to the already learned concept (image of the wild birds of crows) and identify the concept of the new learning data (real image of the pelicans) with no learning results. Since the generation unit 121b may generate an image that is discriminated as the true image (real image of the pelicans or crows) by the aforementioned discrimination unit 122b, as for image generation processing by the generation unit 121b, it becomes possible to add a concept of the new learning data (real image of the pelicans) and generate the image with no learning results.

After the learning processing, the learning data (real image 132b of the pelicans) used in the learning is discarded. For example, to the vendor that provides the aforementioned learning data and commissions the creation of the discrimination model that discriminates the image of the pelicans or the crows, it is possible to deliver the discrimination model according to the aforementioned delivery aspect.

Next, with reference to FIG. 8, in comparison between a system according to the related-art technology that creates the solution unit, referred to as the aforementioned solver (which is referred to as the "related-art technology" in the following description) and the sequential learning device 10 according to Embodiment 2, description is given of differences between the solver and the sequential learning device 10.

As described above, in the related-art system, first, a generation model is created by GAN based on learning data, and a solution model, referred as the solver, is created from the learning independently of the generation model. The solver predicts and outputs a label of the learning data. As a result of the learning, as illustrated in FIG. 8, is obtained as a generation model, a generation unit 301 ($G(X|C_{\{pelican, crow\}})$) that generates the image of the crows and the pelicans.

As the new learning data, as illustrated in FIG. 8, a real image 251 of pelicans and learning data including a label of "pelican" are provided and inputted to a solution unit 302 as the solution model. For example, the solution unit 302 inputs the labeled image as the learning data. The solution unit 302 further inputs a generated image 261 of crows and pelicans outputted by a generation unit 301 which is already prepared, and inputs either "crow" or "pelican", which is the label of the generated image 261 outputted by the solution unit that is created independently during the learning of the aforementioned generation unit 301. The solution unit 302 performs the learning by discriminating what image the respective inputted images are, more specifically, what kind of label the image carries, and, based on the discrimination result, making the update seeking the parameter that makes it possible to determine with precision what kind of label the inputted image carries.

In such a related-art system, however, has a problem that for a loss function expressed by the following expression (1) calculated during learning of the solution unit 302 (solution unit S illustrated in FIG. 8), which is the "solver", if the concept learned so far (for example, a concept learned by a solution unit 312 (solution unit St illustrated in FIG. 8 after learning of the generation unit 301)) does not overlap a concept (real label 252) included in the new learning data, a second term of loss is fixed (maximum) at any given time.

$$\text{Ltrain}(\theta_i) = r\,\mathbb{E}_{(x,y) \sim D_i}[L(S(x;\theta_i),y)] + (1-r)\,\mathbb{E}_{x' \sim G_{i-1}}[L(S(x';\theta_i), S(x';\theta_{i-1}))] \quad (1)$$

In this case, a result is same as a case in which learning is performed with only the new learning data because only the first term of loss is reducible by the learning. The solution unit 302 that abandons the concept learned so far is learned as the solution model. For example, in the example illustrated in FIG. 8, it is believed that the aforementioned influence is suppressed because the concepts (crow and pelican) learned so far overlap the concept (pelican) included in the new learning data. On the other hand, provisionally consider a case in which the new learning data is an image of eagles which does not overlap at all, as a concept. At this time is obtained the solution unit 302 the concept of which does not overlap the new learning data (image of the eagles) and that abandons the concept (crows and pelicans) so far learned. The related-art system has to learn the solution model, which is the "solver", for every learning data to be newly learned, separately from the generation model in GAN.

On the other hand, in the sequential learning device 10 according to Embodiment 2, the discrimination unit obtained by learning utilizes what is learned by a learning method of GAN that inputs the generated image of the generation model (generation unit 121b) including the learning results based on the past learning data (real images of the crows and the pelicans), the new learning data (real image of the eagles), and the generated image generated by the generation model to be paired, and thus it is not a problem whether or not the concepts overlap. The sequential learning device 10 according to Embodiment 2 does not have to create the solution model in the related-art system.

[Process Flows]

Figure 9:
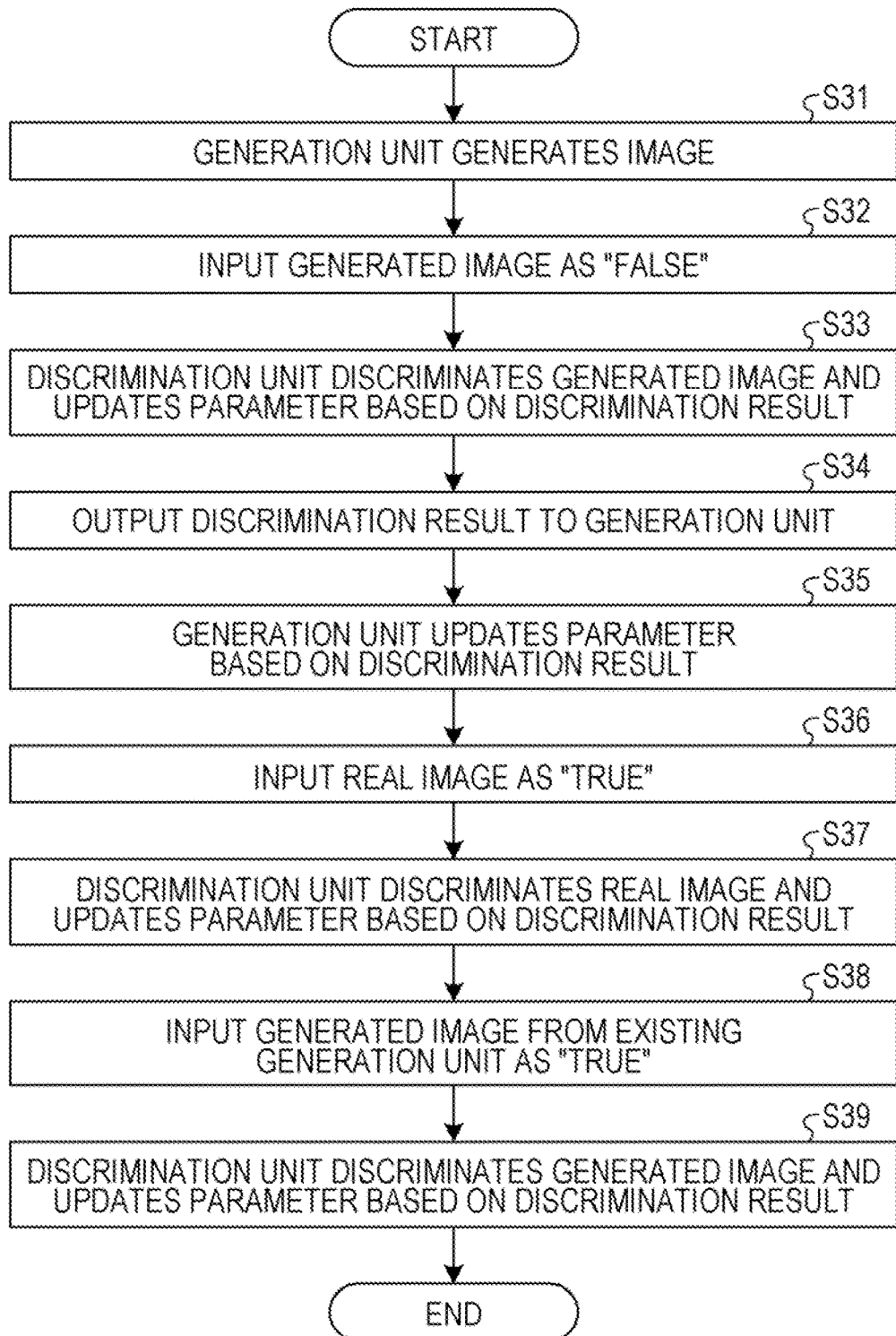
FIG. 9 is a flow chart illustrating an example of flow of a learning action of a sequential learning device according to Embodiment 2.

FIG. 9 is a flow chart illustrating an example of flow of the learning action of the sequential learning device according to Embodiment 2. With reference to FIG. 9, description is given of an example of the flow of the learning action of the sequential learning device 10 according to Embodiment 2. In FIG. 9, description is given focusing on the learning action in the sequential learning device 10b (see FIG. 6) as the sequential learning device 10.

First, the generation unit 121b inputs the data such as the random number, and generates the generated image that causes the discrimination unit 122b to discriminate the image as the true image (step S31). The discrimination unit 122b inputs the generated image generated by the generation unit 121b as the false image (step S32). The discrimination unit 122b determines authenticity of the inputted generated image and based on the discrimination result, makes the update seeking the parameter that makes it possible to determine with precision whether the inputted image is the true image or the false image (step S33). With this, the discrimination unit 122b learns to identify the true image with precision.

The discrimination unit 122b outputs to the generation unit 121b the aforementioned discrimination result on the generated image generated by the generation unit 121b (step S34). The generation unit 121b receives the discrimination result by the discrimination unit 122b, and makes the update seeking the parameter to generate an image that makes it difficult for the discrimination unit 122b to discriminate the image from the true image (step S35). With this, the generation unit 121b learns to generate an image that the discrimination unit 122b may identify as the true image.

The discrimination unit 122b inputs, as the true image, the real image which is the new learning data stored in the storage unit 13b (step S36). The discrimination unit 122b determines authenticity of the inputted real image, and based on the discrimination result, makes the update seeking the parameter that makes it possible to determine with better precision whether the inputted image is the true image or the false image (step S37). With this, the discrimination unit 122b learns to identify the true image with precision.

The discrimination unit 122b inputs, as the true image, the generated image generated by the generation unit 121a, which is the already created generation model (step S38). The discrimination unit 122b determines authenticity of the inputted generated image, and based on the discrimination result, makes the update seeking the parameter that makes it possible to determine with better precision whether the inputted image is the true image or the false image (step S39). With this, the discrimination unit 122b learns to identify the true image with precision.

By processing of the aforementioned steps S31 to S39 being repeated, the learning action of the sequential learning device 10 is performed. The flow of the learning action of the sequential learning device 10 is not limited to the order of steps S31 to S39. As described above, steps S31 to S35 are processing to handle the generated images generated by the generation unit 121b. Steps S36 and S37 are processing to handle the real images stored in the storage unit 13b. Steps S38 and S39 are processing to handle the generated images generated by the generation unit 121a which is the already created generation model. For example, these steps may be performed in random order. The aforementioned processing is not limited to being performed only once, and for example, processing to handle the real images stored in the storage unit 13b may be performed consecutively.

[One Aspect of Effects]

In the sequential learning device 10 according to Embodiment 2, the generated image generated by the generation unit, which is already generated as the generation model, is inputted to the discrimination unit as a true image. For example, to the discrimination unit, the real image, which is the new learning data, is inputted as the true image and the generated image generated by the already created generation model (generation unit) is inputted as the true image. Since the discrimination unit inputs, as the true image, the generated image of the generation model (generation unit) including the learning results based on the past learning data, it becomes possible to add to the already learned concept and identify the concept of the new learning data with no learning results. Since a generation unit to be newly created may generate an image that is discriminated as the true image by the aforementioned discrimination unit, as for image generation processing by the generation unit, it becomes possible to add the concept of the new learning data and generate the an image with no learning results.

Embodiment 3

In the sequential learning device 10 according to Embodiment 2, as described above with reference to the example illustrated in FIG. 6, lastly, the discrimination model is obtained that learns to identify the image of the wild birds of Mexico (MX), the image of the wild birds of America (US), or the wild birds of Canada (CA). In this case, any influence of the learning data from the obtained model may have to be removed because the real image of the wild birds, which is the learning data provided from a specific vendor, includes an error or because the quality is poor. In Embodiment 3, description is given of an action to recreate a model from which any influence of the learning data is removed, assuming that of the learning data reflected in respective models of the last obtained generation unit 121c and the discrimination unit 122c, it is found out that the learning data on America has a problem.

[One Form of Action to Remove any Influence of Learning Data of America from Already Created Model]

Figure 10:
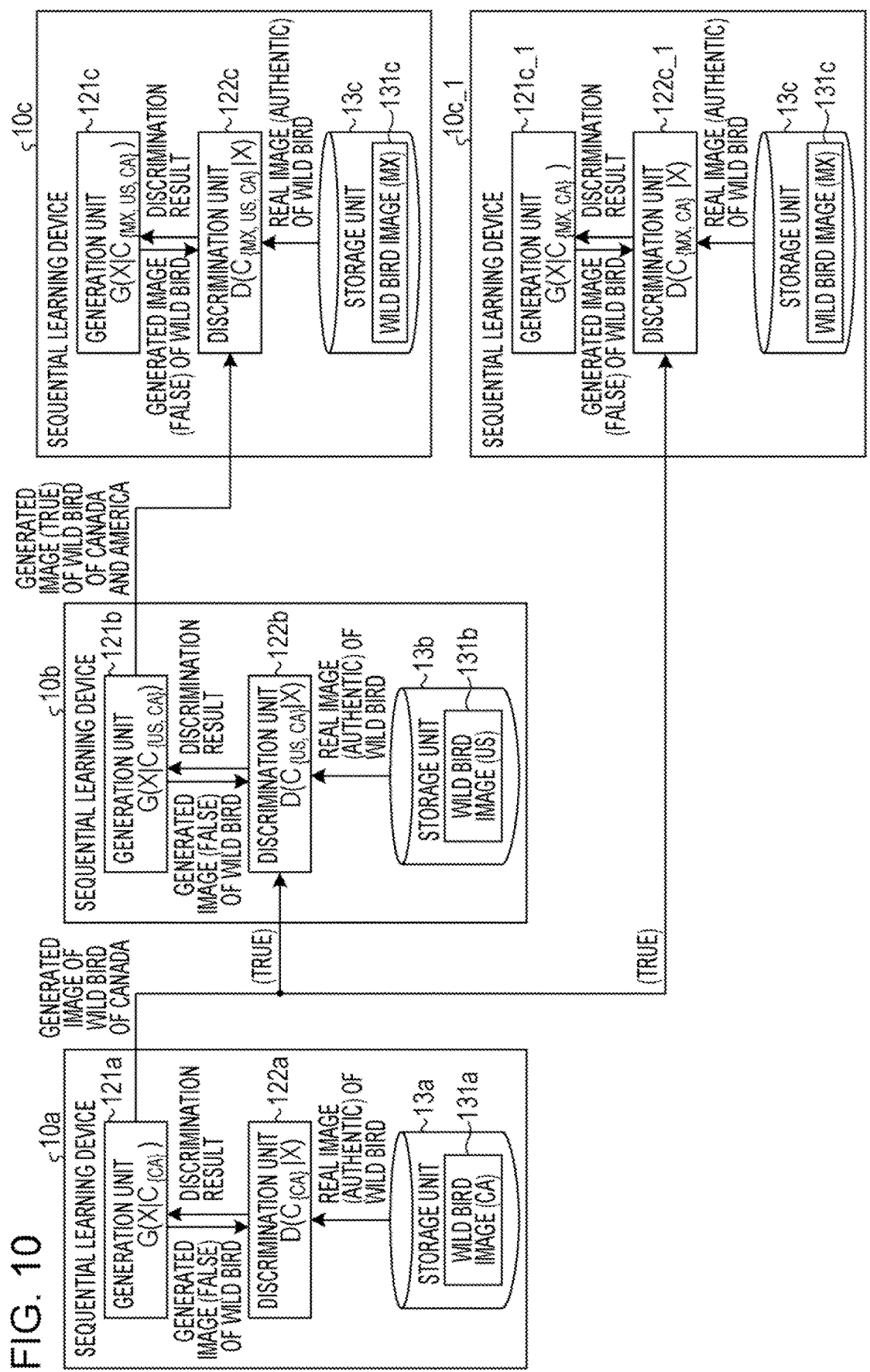
FIG. 10 is a diagram illustrating an action to generate a model from which influence of specific learning data is removed after learning in Embodiment 3, the action in a case in which there is a real image.

FIG. 10 is a diagram illustrating an action to generate a model from which influence of specific learning data is removed after learning in Embodiment 3, the action in a case in which there is a real image. As illustrated in FIG. 10 description is given of the action to remove the influence of the learning data of America (real image of the wild birds of America) from the already created model, the action in a case in which the real image of the wild birds of Mexico (learning data) used in the action to generate the model in the sequential learning device 10c still remains.

In FIG. 10, description is given assuming that actions similar to the actions till the generation of the model of the sequential learning device 10c, which are described in the aforementioned FIG. 6, are already complete. It is assumed that the model from which the influence of the learning data of America is removed is provisionally created by a sequential learning device 10c_1 and that the sequential learning device 10c_1 includes the storage unit 13c.

As illustrated in FIG. 10, in the sequential learning device 10c_1, the generation unit 121c_1 (G(X|C_{MX, CA})) inputs the data such as the random number, and generates the generated image that causes the discrimination unit 122c_1 to discriminate the image as the true image (here, the image of the wild birds of Mexico (MX) or Canada (CA)), and outputs the generated image to the discrimination unit 122c_1. The generation unit 121c_1 corresponds to an example of the fourth generator. The generated image generated by the generation unit 121c_1 corresponds to an example of the fourth generation data.

The discrimination unit 122c_1 (D(C_{MX, CA}|X)) inputs, as the true image, the real image 131c of the wild birds of Mexico (MX), which is the learning data stored and remaining in the storage unit 13c, and inputs, as the false image, the generated image of the wild birds generated by the generation unit 121c_1. The discrimination unit 122c_1 corresponds to an example of the fourth discriminator. The discrimination unit 122c_1 further inputs, as the true image, the generated image of the wild birds of Canada (CA) generated by the generation unit 121a, which is the already created generation model. The discrimination unit 122c_1 determines authenticity of the respective inputted images. The discrimination unit 122c_1 outputs to the generation unit 121c_1 the discrimination result on the generated image generated by the generation unit 121c_1. Based on the respective discrimination results, the discrimination unit 122c_1 performs the learning by making the update seeking the parameter that makes it possible to determine with precision whether the inputted image is the true image or the false image. For example, the discrimination unit 122c_1 learns to identify the image of the wild birds of Mexico (MX) or Canada (CA) from which the influence of the image of the wild birds of America (US) is removed.

The generation unit 121c_1 receives the discrimination result by the discrimination unit 122c_1, and performs the learning by making the update seeking the parameter that makes it difficult for the discrimination unit 122b to discriminate the inputted image from the true image. For example, the generation unit 121c_1 learns to generate an image identified as the image of the wild birds of Mexico (MX) or Canada (CA) from which the Influence of the wild birds of America (US) is removed.

Repeated learning processing of the generation unit 121c_1 and the discrimination unit 122c_1 creates each of a generation model and a discrimination model of the image of the wild birds of Mexico (MX) or America (US) from which the influence of the image of the wild birds of America (US) is removed. In order to remove the influence of the image of the wild birds of America, the discrimination unit 122c_1 inputs, as the true image, the generated image of the generation unit 121a that generates the image of the wild birds of Canada (CA), and not the generation unit 121b which is the already created generation model. The discrimination unit 122c_1 may be recreated as the discrimination model that identifies the image from which the influence of the image of the wild birds of America (US) is removed, with respect to the discrimination unit 122c that identifies the image of the wild birds of Mexico (MX), the image of the wild birds of America (US), or the image of the image of the wild birds of Canada (CA). The generation unit 121c_3 may be recreated as the generation model that generates the image from which the influence of the image of wild birds of America (US) is removed, with respect to the generation unit 121c that generates the image of the wild birds of Mexico (MX), the image of the wild birds of America (US), or the image of the wild birds of Canada (CA).

For the sake of convenience, although description is given with the device divided to the sequential learning devices 10a to 10c and 10c_1 in FIG. 10, a configuration is not limited to this, and each learning processing may be performed by the identical device (sequential learning device 10). For example, although the discrimination unit 122c_1 of the sequential learning device 10c_1 inputs generated image from the generation unit 121a of the sequential learning device 10a, a function as the generation model of the generation unit 121a in the sequential learning device 10a may remain. The real image 131c may be stored in the storage unit 13a and the learning processing of the generation unit 121c_1 and the discrimination unit 122c_1 may be carried out in the same sequential learning device 10a.

[Another Form of Action to Remove Influence of Learning Data of America from Already Created Model]

Figure 11:
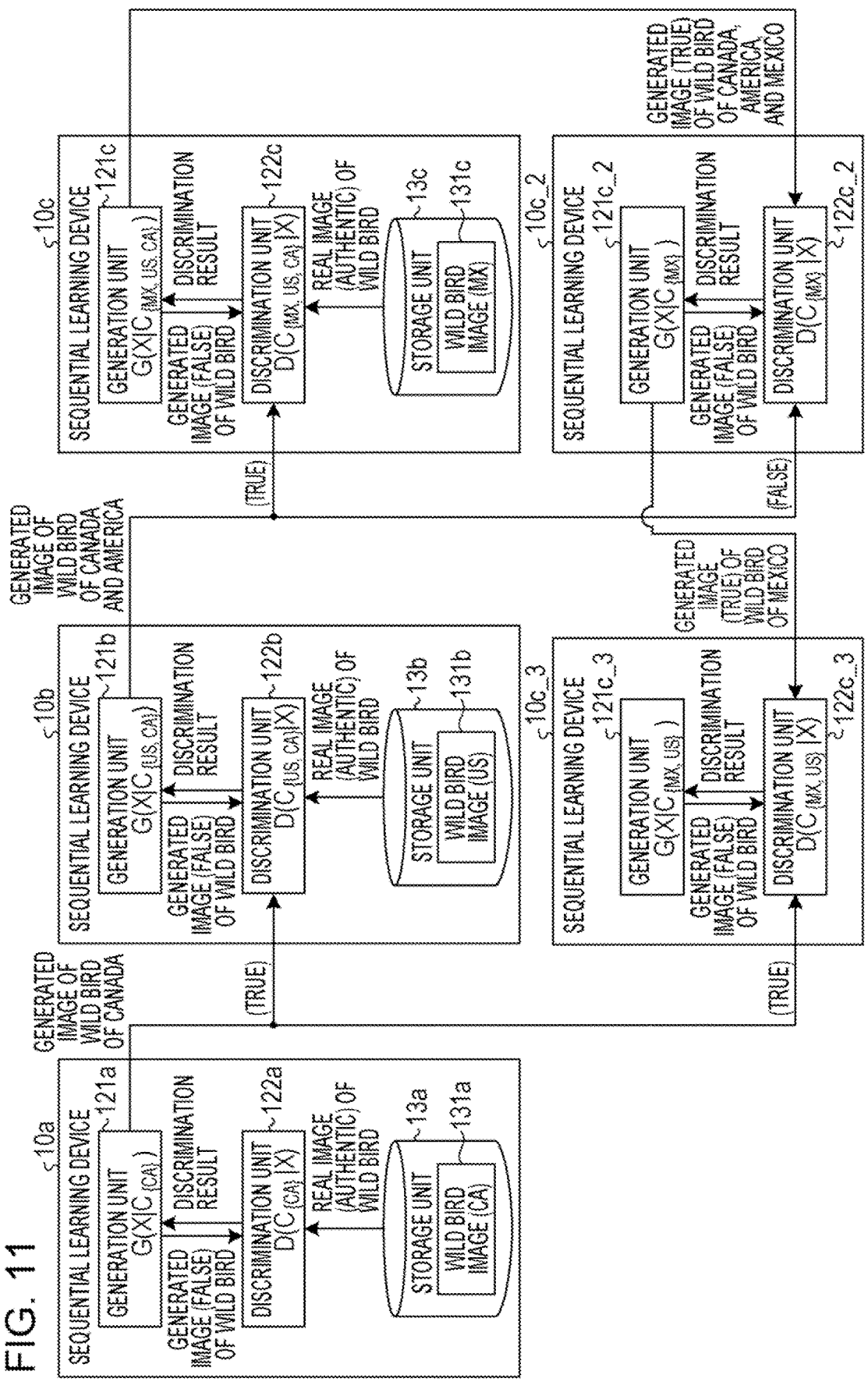
FIG. 11 is a diagram illustrating an action to generate a model from which influence of specific learning data is removed after learning in Embodiment 3, the action in a case in which there is no real image.

FIG. 11 is a diagram illustrating the action to generate a model from which the influence of the specific learning data is removed after the learning in Embodiment 3, the action in a case in which there is no real image. As illustrated in FIG. 11, description is given of the action to remove the influence of the learning data of America (real image of the wild birds of America) from the already created model, the action in a case in which the real image of the wild birds of Mexico (learning data) used in the action to generate the model in the sequential learning device 10c does not remain.

In FIG. 11, description is given assuming that actions similar to the actions till the generation of the model of the sequential learning device 10c, which are described in the aforementioned FIG. 6, are already complete. It is assumed that the model from which the influence of the learning data of America is removed is created provisionally by means of sequential learning devices 10c_2 and 10c_3.

In the example of FIG. 11, since the real image (learning data) of the wild birds of Mexico used in the model generation action in the sequential learning device 10c remains, first, the sequential learning device 10c_2 creates a generation model that may generate the image of the wild birds of Mexico.

As illustrated in FIG. 11, in the sequential learning device 10c_2, a generation unit 121c_2 (G(X|C_{MX})) inputs the data such as the random number, and generates the generated image that causes a discrimination unit 122c_2 to discriminate the generated image of the wild birds of Mexico (MX) as the true image, and outputs the generated image to the discrimination unit 122c_2.

Since the real image 131c of the wild birds of Mexico (MX) is already discarded, in place of the real image 131c of the wild birds of Mexico (MX). the discrimination unit 122c_2 (D(C_{MX}|X)) inputs, as the true image, the images of the wild birds of Mexico (MX), America (US), and Canada (CA) generated by the generation unit 121c which is the already created generation model. The discrimination unit 122c_2 inputs, as the false image, the generated image of the wild birds generated by the generation unit 121c_2. The discrimination unit 122C_2 further inputs, as the false image, the generated image of the wild birds of America (US) or Canada (CA) generated by the generation unit 121b which is the already created generation model. The discrimination unit 122c_2 determines authenticity of the respective inputted images. The discrimination unit 122c_2 outputs to the generation unit 121c_2 the discrimination result on the generated image generated by the generation unit 121c_2. Based on the respective discrimination results, the discrimination unit 122c_2 performs the learning by making the update seeking the parameter that makes it possible to determine with precision whether the inputted image is the true image or the false image. For example, the discrimination unit 122c_2 learns to identify only the image of the wild birds of Mexico (MX).

The generation unit 121c_2 receives the discrimination result by the discrimination unit 122c_2, and performs the learning by making the update seeking the parameter that makes it difficult for the discrimination unit 122c_2 to discriminate the inputted image from the true image. For example, the generation unit 121c_2 learns to generate an image identified as the image of the wild birds of Mexico (MX).

Next, as illustrated in FIG. 11, in the sequential learning device 10c_3, the generation unit 121c_3 ($G(X|C_{\{MX, CA\}})$) inputs the data such as the random number, generates the generated image that causes the discrimination unit 122c_3 to discriminate the generated image of the wild birds of Mexico (MX) or Canada (CA) as the true image, and outputs the generated image to the discrimination unit 122c_3.

The discrimination unit 122c_3 ($D(C_{\{MX, CA\}}|X)$) inputs, as the true image, the generated image of the wild birds of Mexico (MX) generated by the generation unit 121c_2, which is the generation model created in the sequential learning device 10c_2, and inputs, as the false image, the generated image of the wild birds generated by the generation unit 121c_3. The discrimination unit 122c_3 further inputs, as the true image, the generated image of the wild birds of Canada (CA) generated by the generation unit 121a, which is the already created generation model. The discrimination unit 122c_3 determines authenticity of the respective inputted images. The discrimination unit 122c_3 outputs to the generation unit 121c_3 the discrimination results on the generated image generated by the generation unit 121c_3. Based on the respective discrimination results, the discrimination unit 122c_3 performs the learning by making the update seeking the parameter that makes it possible to determine with precision whether the inputted image is the true image or the false image. For example, the discrimination unit 122c_3 leans to identify the wild birds of Mexico (MX) or Canada (CA), and thus enters a state in which the influence of the image of the wild birds of America (US) is removed.

The generation unit 121c_3 receives the discrimination result by the discrimination unit 122c_3, and performs the learning by making the update seeking the parameter that makes it difficult for the discrimination unit 122c_3 to discriminate the inputted image from the true image. For example, the generation unit 121c_3 learns to generate an image identified as the image of the wild birds of Mexico (MX) or Canada (CA) and enters the state in which the influence of the image of the wild birds of America (US) is removed.

By the aforementioned learning processing in the sequential learning devices 10c_2 and 10c_3 being performed, a generation model and a discrimination model are generated for the image of the wild birds of Mexico (MX) or Canada (CA) from which the influence of the image of the wild birds of America (US) is removed. Since the real image of the wild birds of Mexico (learning data) does not remain, first, the sequential learning device 10c_2 creates the generation model (generation unit 121c_2) to generate the image of the wild birds of Mexico (MX). The discrimination model (discrimination unit 122c_3) is created using the generation unit 121a that generates the image of the wild birds of Canada (CA) and the generation unit 121c_2 that generates the image of the wild birds of Mexico (MX). The discrimination unit 122c_3 may be recreated as the discrimination model that identifies the image from which the influence of the wild birds of America (US) is removed, with respect to the discrimination unit 122c that identifies the image of the wild birds of Mexico (MX), the image of the wild birds of America (US), or the image of the wild birds of Canada (CA). The generation unit 121c_3 may be recreated as the generation model that generates the image from which the influence of the image of wild birds of America (US) is removed, with respect to the generation unit 121c that generates the image of the wild birds of Mexico (MX), the image of the wild birds of America (US), or the image of the wild birds of Canada (CA).

For the sake of convenience, although description is given with the sequential learning devices divided to the sequential learning devices 10a to 10c, 10c_2, and 10c_3 in FIG. 11, a configuration is not limited to this, and each learning processing may be performed by the identical device (sequential learning device 10). For example, although the discrimination unit 122c_3 of the sequential learning device 10c_3 inputs generated image from the generation unit 121c_2 of the sequential learning device 10c_2, a function as the generation model of the generation unit 121c_2 in the sequential learning device 10c_2 may remain. The learning processing of the generation unit 121c_3 and the discrimination unit 122c_3 may be carried out in the same sequential learning device 10c_2.

[One Aspect of Effects]

As described above, in the sequential learning device 10 according to Embodiment 3, if the influence of the specific learning data is to be removed from the obtained generation model and discrimination model, the already created generation model is selectively used. The generation model and the discrimination model from which the learning data is removed may be created. In the examples illustrated in FIGS. 10 and 11, each of a discrimination model and a generation model that identify and generate an image from which the influence of the wild birds of America (US) is removed may also be recreated, with respect to the generation model and the discrimination model about the image of the wild birds of Mexico (MX), the image of the wild birds of America (US), or the image of the wild birds of Canada (CA).

In contrast, in the related-art system, even if it is found out later that the learning data that is already learned is incorrect, the learning data may not be excluded.

Embodiment 4

In Embodiment 3, description is given of the action to recreate the model from which the influence of the learning data of America is removed, of the learning data reflected in each model of the lastly obtained generation unit 121c and the discrimination unit 122c. In Embodiment 4, on the assumption that of the learning data reflected in each model of the lastly obtained generation unit 121c and discrimination unit 122c, the learning data of Canada has a problem, description is given of the action to recreate the model from which the influence of the learning data.

[One Form of Action to Remove Influence of earning Data of Canada from Already Created Model]

Figure 12:
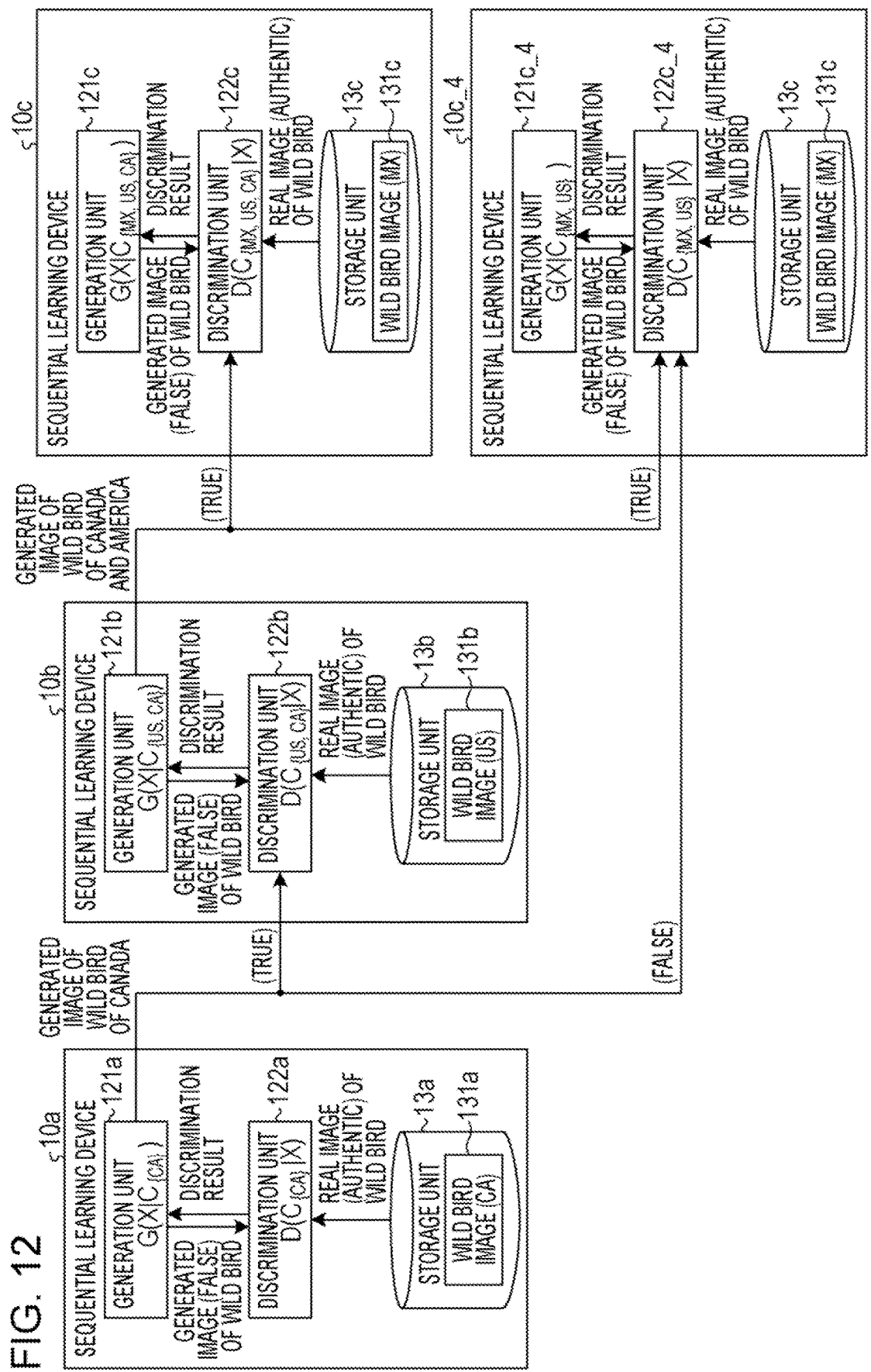
FIG. 12 is a diagram illustrating an action to generate a model from which influence of specific learning data is removed after learning in Embodiment 4, the action in a case in which there is a real image.

FIG. 12 is a diagram illustrating the action to generate the model from which the influence of the specific learning data is removed after the learning in Embodiment 4, the action in a case in which there is the real image. As illustrated in FIG. 12, description is given of the action to remove the influence of the learning data of Canada (real image of the wild birds of Canada) from the already created model, the action in a case in which the real image of the wild birds of Mexico (learning data) used in the action to generate the model in the sequential learning device 10c remains.

In FIG. 12, description is given assuming that actions similar to the actions till the generation of the model of the sequential learning device 10c, which are described in the aforementioned FIG. 6, are already complete. It is assumed that the model from which the influence of the learning data of Canada is removed is provisionally created by a sequential learning device 10c_4 and that the sequential learning device 10c_4 includes the storage unit 13c.

As illustrated in FIG. 12, in the sequential learning device 10c_4, the generation unit 121c_4 ($G(X|C_{\{MX, US\}})$) inputs the data such as the random number, generates the generated image that causes the discrimination unit 122c_4 to discriminate the generated image of the wild birds of Mexico (MX) or America (US) as the true image, and outputs the generated image to the discrimination unit 122c_4. The generation unit 121c_4 corresponds to an example of the fourth generator. The generated Image generated by the generation unit 121c_4 corresponds to an example of the fourth generation data.

The discrimination unit 122c_4 ($D(C_{\{MX, US\}}|X)$) inputs, as the true image, the real image 131c of the wild birds of Mexico (MX), which is the learning data stored and remains in the storage unit 13c, and inputs, as the false image, the generated image of the wild birds generated by the generation unit 121c_4. The discrimination unit 122c_4 corresponds to an example of the fourth discriminator. The discrimination unit 122c_4 further inputs, as the false image, the wild birds of Canada (CA) generated by the generation unit 121a, which is the already created generation model, and inputs, as the true image, the generated image of the wild birds of America (US) or Canada (CA) generated by the generation unit 121b which is the already created generation model. The discrimination unit 122c_4 determines authenticity of the respective inputted images. The discrimination unit 122c_4 outputs to the generation unit 121c_4 the discrimination results on the generated image generated by the generation unit 121c_4. Based on the respective discrimination results, the discrimination unit 122c_4 performs the learning by making the update seeking the parameter that makes it possible to determine with precision whether the inputted image is the true image or the false image. For example the discrimination unit 122c_4 learns to identify the image of the wild birds of Mexico (MX) or America (US) from which the influence of the image of the wild birds of Canada (CA) is removed.

The generation unit 121c_4 receives the discrimination result by the discrimination unit 122c_4, and performs the learning by making the update seeking the parameter that makes it difficult for the discrimination unit 122c_4 to discriminate the inputted image from the true image. For example, the generation unit 121c_4 learns to create an image identified as the image of the wild birds of Mexico (MX) or America (US) from which the influence of the image of the wild birds of Canada (CA) is removed.

By the aforementioned learning processing in the generation unit 121c_4 and the discrimination unit 122c_4 being repeated, a generation model and a discrimination model are generated for the image of the wild birds of Mexico (MX) or America (US) from which the influence of the image of the wild birds of Canada (CA) is removed. In order to remove the influence of the image of the wild birds of Canada, the discrimination unit 122c_4 inputs, as the false image, the generated image of the generation unit 121a that generates the image of the wild birds of Canada (CA), in addition to inputting, as the true image, the generated image of the generation unit 121b, which is the already created generation model. The discrimination unit 122c_4 may be recreated as the discrimination model to identify the image from which the influence of the image of the wild birds of Canada (CA) is removed, with respect to the discrimination unit 122c that identifies the image of the wild birds of Mexico (MX), the image of the wild birds of America (US), or the image of the wild birds of Canada (CA). The generation unit 121c_4 may be recreated as the generation model to generate the image from which the influence of the image of the wild birds of Canada (CA) is removed, with respect to the generation unit 121c that generates the image of the wild bird of Mexico (MX), the image of the wild birds of America (US), and the image of the wild birds of Canada (CA).

For the sake of convenience, although description is given with the sequential learning devices divided to the sequential learning devices 10a to 10c and 10c_4 in FIG. 12, a configuration is not limited to this, and each learning processing may be performed by the identical device (sequential learning device 10). For example, although the discrimination unit 122c_4 of the sequential learning device 10c_4 inputs generated image from the generation unit 121a of the sequential learning device 10a, a function as the generation model of the generation unit 121a in the sequential learning device 10a may remain. The real image 131c may be stored in the storage unit 13a and the learning processing of the generation unit 121c_4 and the discrimination unit 122c_4 may be carried out in the same sequential learning device 10a.

[Another Form of Action to Remove Influence of Learning Data of Canada from Already Created Model]

Figure 13:
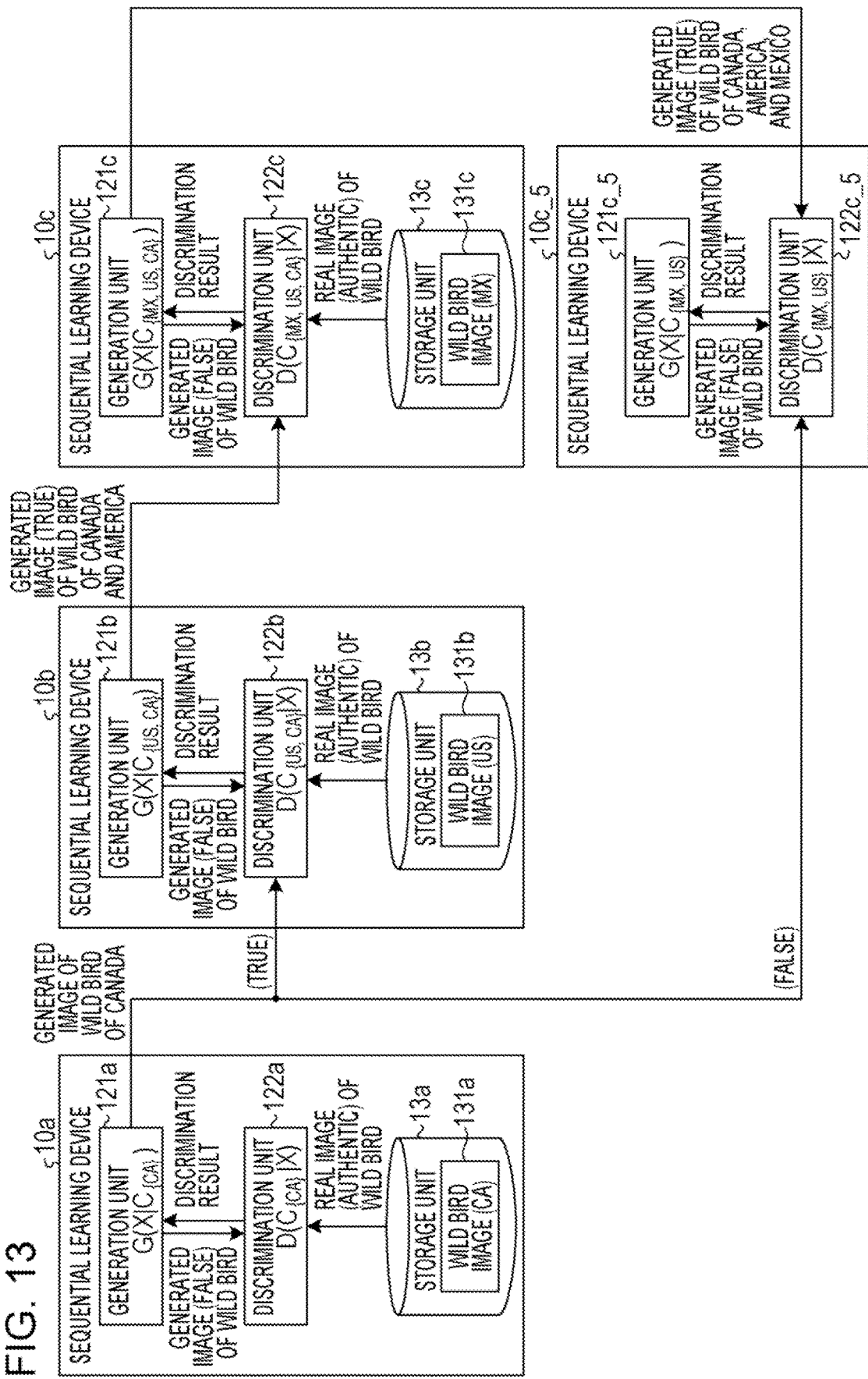
FIG. 13 is a diagram illustrating an action to generate a model from which influence of specific learning data is removed after learning in Embodiment 4, the action in a case in which there is no real image.

FIG. 13 is a diagram illustrating the action to generate the model from which the influence of the specific learning data is removed after the learning in Embodiment 4, the action in a case in which there is no real image. As illustrated in FIG. 13, description is given of the action to remove the influence of the learning data of Canada (real image of the wild birds of Canada) from the already created model, the action in a case where the real image of the wild birds of Mexico (learning data) used in the action to generate the model in the sequential learning device 10c does not remain.

In FIG. 13, description is given assuming that actions similar to the actions till the generation of the model of the sequential learning device 10c, which are described in the aforementioned FIG. 6, are already complete. The model from which the influence of the learning data of Canada is removed is created provisionally with a sequential learning device 10c_5.

As illustrated in FIG. 13, in the sequential learning device 10c_5, a generation unit 121c_5 ($G(X|C_{\{MX, US\}})$) inputs the data such as the random number, and generates the generated image that causes a discrimination unit 122c_5 to discriminate the generated image of the wild birds of Mexico (MX) or America (US) as the true image, and outputs the generated image to the discrimination unit 122c_5. The generation unit 121c_5 corresponds to an example of the fourth generator. The generated image generated by the generation unit 121c_5 corresponds to an example of the fourth generation data.

The discrimination unit 122c_5 ($D(C_{\{MX, US\}}|X)$) inputs the generated image of the wild birds generated by the generation unit 121c_5 as the false image. The discrimination unit 122c_5 corresponds to an example of the fourth discriminator. The discrimination unit 122c_5 further inputs, as the false image, the generated image of the wild birds of Canada (CA) generated by the generation unit 121a which is the already created generation model, and inputs, as the true image, the generated image of the wild birds of Mexico (MX), America (US), or Canada (CA) generated by the generation unit 121c which is the already created generation model. The discrimination unit 122c_5 determines authenticity of the respective inputted images. The discrimination unit 122c_5 outputs to the generation unit 121c_5 the discrimination results on the generated image generated by the generation unit 121c_5. Based on the respective discrimination results, the discrimination unit 122c_5 performs the learning by making the update seeking the parameter that makes it possible to determine with precision whether the inputted image is the true image or the false image. For example, the discrimination unit 122c_5 learns to identify the image of the wild birds of Mexico (MX) or America (US) from which the influence of the image of the wild birds of Canada (CA) is removed.

The generation unit 121c_5 receives the discrimination result by the discrimination unit 122c_5, and performs the learning by making the update seeking the parameter that makes it difficult for the discrimination unit 122c_5 to discriminate the inputted image from the true image. For example, the generation unit 121c_5 learns to create an image identified as the image of the wild birds of Mexico (MX) or America (US) from which the influence of the image of the wild birds of Canada (CA) is removed.

By the aforementioned learning processing in the generation unit 121c_5 and the discrimination unit 122c_5 being repeated, a generation model and a discrimination model are generated for the image of the wild birds of Mexico (MX) or America (US) from which the influence of the image of the wild birds of Canada (CA) is removed. In order to remove the influence of the image of the wild birds of Canada, the discrimination unit 122c_5 inputs, as the false image, the generated image of the generation unit 121a that generates the image of the wild birds of Canada (CA), in addition to inputting, as the true image, the generated image of the generation unit 12k, which is the already created generation model. The discrimination unit 122c_5 may be recreated as the discrimination model to identify the image from which the influence of the image of the wild birds of Canada (CA) is removed, with respect to the discrimination unit 122c that identifies the image of the wild birds of Mexico (MX), the image of the wild birds of America (US), or the image of the wild birds of Canada (CA) The generation unit 121c_5 may be recreated as the generation model to generate the image from which the influence of the image of the wild birds of Canada (CA) is removed, with respect to the generation unit 121c that generates the image of the wild birds of Mexico (MX), the image of the wild birds of America (US), and the image of the wild birds of Canada (CA).

For the sake of convenience, although description is given with the sequential learning devices divided to the sequential learning devices 10a to 10c and 10c_5 in FIG. 13, a configuration is not limited to this, and each learning processing may be performed by the identical device (sequential learning device 10). For example, although the discrimination unit 122c_5 of the sequential learning device 10c_5 inputs generated image from the generation unit 121a of the sequential learning device 10a, a function as the generation model of the generation unit 121a in the sequential learning device 10a may remain. The learning processing of the generation unit 121c_5 and the discrimination unit 122c_5 may be carried out in the same sequential learning device 10a.

[One Aspect of Effects]

As described above, in the sequential learning device 10 according to Embodiment 3, if the influence of the specific learning data is to be removed from the obtained generation model and discrimination model, the already created generation model is selectively used. The generation model and the discrimination model from which the learning data is removed may be created. In the examples illustrated in FIGS. 12 and 13, each of a discrimination model and a generation model that identify and generate an image from which the influence of the wild birds of Canada (CA) is removed may also be recreated, with respect to the generation model and the discrimination model about the image of the wild birds of Mexico (MX), the image of the wild birds of America (US), or the image of the wild birds of Canada (CA).

In contrast, in the related-art system, even if it is found out later that the learning data that is already learned is incorrect, the learning data may not be excluded.

[Sequential Learning Program]

Figure 14:
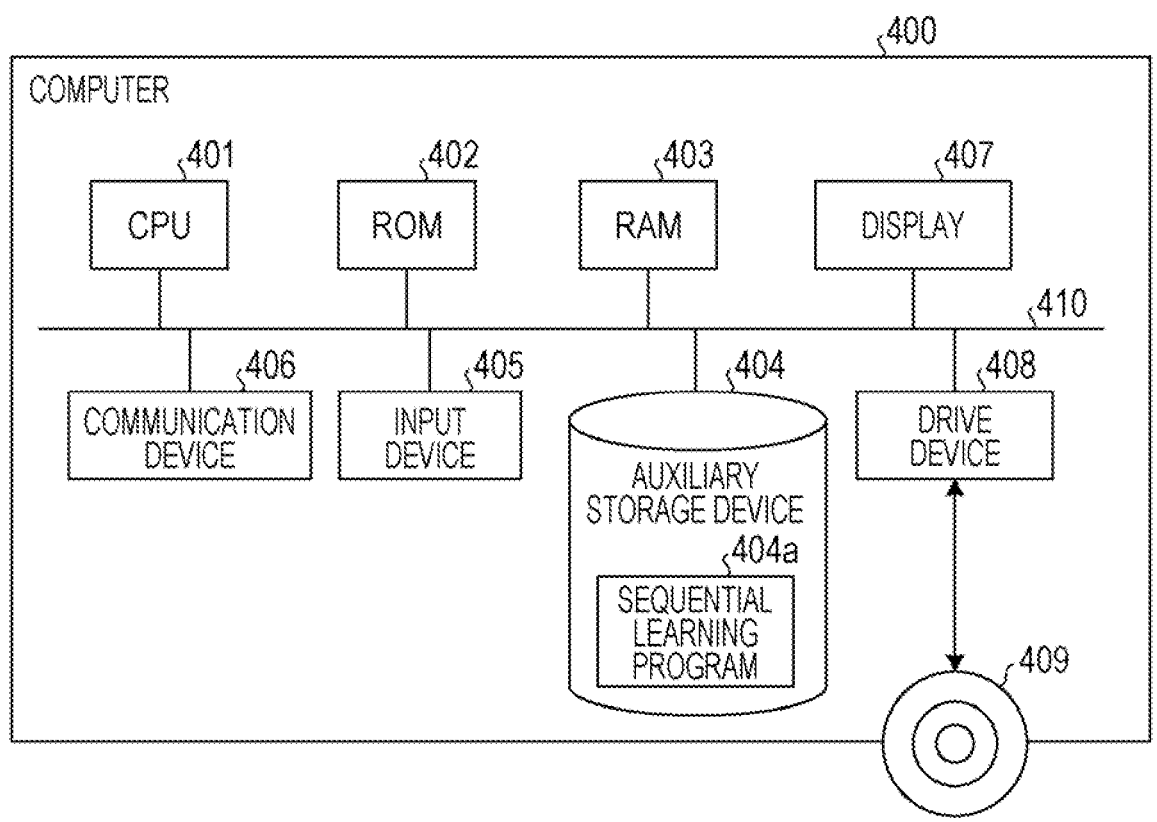
FIG. 14 is a diagram illustrating an example of a hardware configuration of a computer that executes a sequential learning program related to Embodiments 1 to 4.

FIG. 14 is a diagram illustrating an example of a hardware configuration of a computer that executes a sequential learning program related to Embodiments 1 to 4. Various processing described in the aforementioned respective examples may be implemented by execution of a prepared program on a personal computer (PC) or a computer such as a workstation. In the following, with reference to FIG. 14, description is given of an example of a computer that executes a sequential learning program having functions similar to the aforementioned respective examples.

As illustrated in FIG. 14, a computer 400 includes a central processing unit (CPU) 401, a read-only memory (ROM) 402, a random-access memory (RAM) 403, an auxiliary storage device 404, an input device 405, a communication device 406, a display 407, and a drive device 408. These units are coupled to each other via a bus 410. The drive device 408 is a device for performing read or write to a removable disk 409, for example.

As illustrated in FIG. 14, the auxiliary storage device 404 stores a sequential learning program 404a that fulfills functions similar to the generation unit 121 (generation units 121a, 121b, 121c, 121c_1 to 121c_5), and the discrimination unit 122 (discrimination units 122a, 122b 122c, 122c_1 to 122c_5). Similarly to the respective components, the sequential learning program 404a may be integrated or separated. For example, the auxiliary storage device 404 may not have to store all data described in the aforementioned respective examples, and data used in processing may be stored in the auxiliary storage device 404.

Under such an environment, after reading the sequential learning program 404a from the auxiliary storage device 404, the CPU 401 is deployed to the RAM 403, and fulfills the aforementioned functions. For example, examples of processing to execute the sequential learning program 404a include processing illustrated in FIGS. 5 and 9, or the like. In the CPU 401, all of the processing units described in the aforementioned respective examples do not have to operate, and the processing unit corresponding to processing to be performed may be virtually implemented.

The aforementioned sequential learning program 404a may not have to be stored in the auxiliary storage device 404 or the ROM 402 from the beginning. For example, the sequential learning program 404a is stored in a "portable physical medium" such as a flexible disc (FD), a compact disc read only memory (CD-ROM), digital versatile disc (DVD), a magneto optical disc, an IC card, or the like, inserted in a computer 400. The computer 400 may acquire and execute the sequential learning program 404*a* from the portable physical medium. The sequential learning program 404*a* may be stored in other computer or workstation or the like coupled to the computer 400 via a public line, the Internet, a local area network (LAN), a wide area network (WAN), or the like, and the computer 400 may acquire the sequential learning program 404*a* from the other computer or workstation or the like, and execute the sequential learning program 404*a*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
   receiving, at a discriminator of a sequential learning device within a generative adversarial network, first generation data from a first generator from a preceding sequential learning device within the generative adversarial network, the first generator having performed learning using a first data group to train the preceding sequential learning device;
   receiving, at the discriminator of the sequential learning device, a second data group, the second data group being true data; and
   performing learning of a second generator based on the first generation data and the second data group, the first generation data received from the preceding sequential learning device is handled as false data by the second generator, wherein
   the discriminator discriminates between images based on the first generation data and the second data group.

2. The non-transitory, computer-readable recording medium of claim 1, the process further comprising:
   obtaining, at the discriminator, second generation data output from the second generator;
   performing learning of the discriminator by discriminating respective pieces of the first generation data, the second data group, and the second generation data;
   outputting, to the second generator, a discrimination result on the second generation data; and
   causing the second generator to perform learning based on the discrimination result outputted from the discriminator.

3. The non-transitory, computer-readable recording medium of claim 1, wherein the first data group and the second data group are images.

4. The non-transitory, computer readable medium of claim 2, wherein the first data group and the second data group are images.

5. The non-transitory, computer readable medium of claim 1, wherein the first data group is discarded after learning of the first generator and the performing learning of the second generator is completed without use of the discarded first data group.

6. An apparatus comprising:
   a memory; and
   a processor coupled to the memory and configured to
      receive, at a discriminator of a sequential learning device within a generative adversarial network, first generation data from a first generator from a preceding sequential learning device within the generative adversarial network, the first generator having performed learning using a first data group to train the preceding sequential learning device;
      receive, at the discriminator of the sequential learning device, a second data group, the second data group being true data; and
   perform learning of a second generator based on the first generation data and the second data group, the first generation data received from the preceding sequential learning device is handled as false data by the second generator, wherein
      the discriminator discriminates between images based on the first generation data and the second data group.

7. The apparatus of claim 6, wherein
   the processor is further configured to:
      obtain, at the discriminator, second generation data output from the second generator;
      perform learning of the discriminator by discriminating respective pieces of the first generation data, the second data group, and the second generation data;
      output, to the second generator, a discrimination result on the second generation data; and
      cause the second generator to perform learning based on the discrimination result outputted from the discriminator.

8. The apparatus of claim 6, wherein the first data group and the second data group are images.

9. The apparatus of claim 7, wherein first data group and the second data group are images.

10. The apparatus of claim 6, wherein the first data group is discarded after learning of the first generator and the performing learning of the second generator is completed without use of the discarded first data group.

11. A method performed by a computer, the method comprising:
   receiving, at a discriminator of a sequential learning device within a generative adversarial network, first generation data from a first generator from a preceding sequential learning device within the generative adversarial network, the first generator having performed learning using a first data group to train the preceding sequential learning device;
   receiving, at the discriminator of the sequential learning device, a second data group, the second data group being true data; and
   performing learning of a second generator based on the first generation data and the second data group, the first generation data received from the preceding sequential learning device is handled as false data by the second generator, wherein
   the discriminator discriminates between images based on the first generation data and the second data group.

12. The method of claim 11, further comprising:
   obtaining, at the discriminator, second generation data output from the second generator;

performing learning of the discriminator by discriminating respective pieces of the first generation data, the second data group, and the second generation data;

outputting, to the second generator, a discrimination result on the second generation data; and causing the second generator to perform learning based on the discrimination result outputted from the discriminator.

13. The method of claim 11, wherein the first data group and the second data group are images.

14. The method of claim 12, wherein the first data group and the second data group are images.

15. The method of claim 11, wherein the first data group is discarded after learning of the first generator and the performing learning of the second generator is completed without use of the discarded first data group.

* * * * *